US012183267B2

(12) United States Patent
Yang et al.

(10) Patent No.: US 12,183,267 B2
(45) Date of Patent: Dec. 31, 2024

(54) DISPLAY APPARATUS INCLUDING DRIVING DEVICES THAT BYPASS INPUT COMMON COMMAND DATA, AND IMAGE DISPLAY APPARATUS INCLUDING SAME

(71) Applicant: LG ELECTRONICS INC., Seoul (KR)

(72) Inventors: Sungoh Yang, Seoul (KR); Jonghyug Bae, Seoul (KR); Yanghyun Kim, Seoul (KR); Woosik Jung, Seoul (KR); Yonghyun Kim, Seoul (KR); Chansic Park, Seoul (KR); Myungdeok Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/285,973

(22) PCT Filed: Apr. 8, 2021

(86) PCT No.: PCT/KR2021/004393

§ 371 (c)(1),
(2) Date: Oct. 6, 2023

(87) PCT Pub. No.: WO2022/215774

PCT Pub. Date: Oct. 13, 2022

(65) Prior Publication Data

US 2024/0185768 A1 Jun. 6, 2024

(51) Int. Cl.
*G09G 3/32* (2016.01)

(52) U.S. Cl.
CPC ....... *G09G 3/32* (2013.01); *G09G 2310/0208* (2013.01); *G09G 2310/0286* (2013.01); *G09G 2360/02* (2013.01); *G09G 2370/08* (2013.01)

(58) Field of Classification Search
None
See application file for complete search history.

(56) References Cited

U.S. PATENT DOCUMENTS

2001/0013850 A1* 8/2001 Sakaguchi ........... G09G 3/3688 345/87
2003/0085854 A1* 5/2003 Tsuji .................... G09G 3/3216 345/82
2006/0267925 A1* 11/2006 Sakamaki ............ G09G 3/3611 345/104
2011/0285325 A1* 11/2011 Jheng ..................... H05B 45/10 315/312

(Continued)

FOREIGN PATENT DOCUMENTS

JP 2013-15845 A 1/2013
KR 10-2011-0128735 A 11/2011

(Continued)

*Primary Examiner* — Kirk W Hermann
(74) *Attorney, Agent, or Firm* — Birch, Stewart, Kolasch & Birch, LLP

(57) ABSTRACT

A display apparatus in one example can include a plurality of light emitting diodes, and a plurality of driving devices to output driving signals for driving the plurality of light emitting diodes. Each of the plurality of driving devices bypasses input common command data and outputs the common command data to an adjacent driving device. Accordingly, a transmission period of data transmitted to the plurality of driving devices can be reduced.

13 Claims, 18 Drawing Sheets

(56) References Cited

U.S. PATENT DOCUMENTS

2016/0351090 A1* 12/2016 Jung .................... G09G 3/2051
2018/0342222 A1* 11/2018 Kang ..................... G09G 3/003
2020/0312222 A1* 10/2020 Hussell .................... G09G 3/32

FOREIGN PATENT DOCUMENTS

KR 10-2012-0118453 A 10/2012
KR 10-2017-0073315 A 6/2017
KR 10-2017-0102691 A 9/2017

* cited by examiner

FIG. 10A

| Time | | t1 | t2 | t3 | t4 | t5 | t6 | t7 | t8 | t9 | t10 | |
|---|---|---|---|---|---|---|---|---|---|---|---|---|
| Control | | 0 | 0 | 0 | 0 | 0 | 0 | 0 | 0 | 1 | 0 | |
| HOST | | DRax data | | | DRbx data | | | DRcx data | | | | |
| | | 1 | 0 | 0 | 0 | 1 | 0 | 0 | 0 | 1 | x | |
| DRax | D0 | x | 1 | 0 | 0 | 0 | 1 | 0 | 0 | 0 | 1 | |
| | D1 | x | x | 1 | 0 | 0 | 0 | 1 | 0 | 0 | 0 | Ara1x |
| | D2 | x | x | x | 1 | 0 | 0 | 0 | 1 | 0 | 0 | |
| DRbx | D0 | x | x | x | x | 1 | 0 | 0 | 0 | 1 | 0 | |
| | D1 | x | x | x | x | x | 1 | 0 | 0 | 0 | 1 | Arb1x |
| | D2 | x | x | x | x | x | x | 1 | 0 | 0 | 0 | |
| DRcx | D0 | x | x | x | x | x | x | x | 1 | 0 | 0 | |
| | D1 | x | x | x | x | x | x | x | x | 1 | 0 | Arc1x |
| | D2 | x | x | x | x | x | x | x | x | x | 1 | |

FIG. 10B

| Time | | t1 | t2 | t3 | t4 | t5 | t6 | t7 | t8 | t9 | t10 |
|---|---|---|---|---|---|---|---|---|---|---|---|
| Control | | 0 | 0 | 0 | 0 | 0 | 0 | 0 | 0 | 1 | 0 |
| HOST | | DRax data | | | DRbx data | | | DRcx data | | | |
| | | 1 | 1 | 0 | 1 | 0 | 0 | 0 | 1 | 0 | x |
| DRax | D0 | x | 1 | 1 | 0 | 1 | 0 | 0 | 0 | 1 | 0 |
| | D1 | x | x | 1 | 1 | 0 | 1 | 0 | 0 | 0 | 1 |
| | D2 | x | x | x | 1 | 1 | 0 | 1 | 0 | 0 | 0 |
| DRbx | D0 | x | x | x | x | 1 | 1 | 0 | 1 | 0 | 0 |
| | D1 | x | x | x | x | x | 1 | 1 | 0 | 1 | 1 |
| | D2 | x | x | x | x | x | x | 1 | 1 | 0 | 0 |
| DRcx | D0 | x | x | x | x | x | x | x | 1 | 1 | 0 |
| | D1 | x | x | x | x | x | x | x | x | 1 | 0 |
| | D2 | x | x | x | x | x | x | x | x | x | 1 |

Ara2x Arb2x Arc2x

FIG. 10C

| Time | | t1 | t2 | t3 | t4 | t5 | t6 | t7 | t8 | t9 | t10 | |
|---|---|---|---|---|---|---|---|---|---|---|---|---|
| Control | | 0 | 0 | 0 | 0 | 0 | 0 | 0 | 0 | 1 | 0 | |
| HOST | | DRax data | | | DRbx data | | | DRcx data | | | | |
| | | 0 | 1 | 0 | 0 | 1 | 0 | 0 | 1 | 0 | x | |
| DRax | D0 | x | 0 | 1 | 0 | 0 | 1 | 0 | 0 | 1 | 0 | |
| | D1 | x | x | 0 | 1 | 0 | 0 | 1 | 0 | 0 | 1 | Ara3x |
| | D2 | x | x | x | 0 | 1 | 0 | 0 | 1 | 0 | 0 | |
| DRbx | D0 | x | x | x | x | 0 | 1 | 0 | 0 | 1 | 0 | |
| | D1 | x | x | x | x | x | 0 | 1 | 0 | 0 | 1 | Arb3x |
| | D2 | x | x | x | x | x | x | 0 | 1 | 0 | 0 | |
| DRcx | D0 | x | x | x | x | x | x | x | 0 | 1 | 0 | |
| | D1 | x | x | x | x | x | x | x | x | 0 | 1 | Arc3x |
| | D2 | x | x | x | x | x | x | x | x | x | 0 | |

FIG. 12B

| Time | | t1 | t2 | t3 | t4 | |
|---|---|---|---|---|---|---|
| Control | | 1 | 1 | 1 | 0 | |
| HOST | | Control data | | | x | |
| | | 0 | 1 | 0 | 0 | |
| DRa | D0 | x | 0 | 1 | 0 | |
| | D1 | x | x | 0 | 1 | Ara1 |
| | D2 | x | x | x | 0 | |
| DRb | D0 | x | 0 | 1 | 0 | |
| | D1 | x | x | 0 | 1 | Arb1 |
| | D2 | x | x | x | 0 | |
| DRc | D0 | x | 0 | 1 | 0 | |
| | D1 | x | x | 0 | 0 | Arc1 |
| | D2 | x | x | x | 1 | |

FIG. 13B

| Time | | t1 | t2 | t3 | t4 | t5 | t6 | t7 | |
|---|---|---|---|---|---|---|---|---|---|
| Control | | 0 | 0 | 0 | 0 | 0 | 0 | 1 | |
| HOST | | DRa data | | DRb data | | DRc data | | | |
| | | 1 | 1 | 1 | 0 | 0 | 1 | x | |
| DRa | D0 | x | 1 | 1 | 1 | 0 | 0 | 1 | Ara2 |
| | D1 | x | x | 1 | 1 | 1 | 0 | 0 | |
| | D2 | x | x | x | x | x | x | x | |
| DRb | D0 | x | x | x | 1 | 1 | 1 | 0 | Arb2 |
| | D1 | x | x | x | x | 1 | 1 | 1 | |
| | D2 | x | x | x | x | x | x | x | |
| DRc | D0 | x | x | x | x | x | 1 | 1 | Arc2 |
| | D1 | x | x | x | x | x | x | 1 | |
| | D2 | x | x | x | x | x | x | x | |

DISPLAY APPARATUS INCLUDING DRIVING DEVICES THAT BYPASS INPUT COMMON COMMAND DATA, AND IMAGE DISPLAY APPARATUS INCLUDING SAME

CROSS REFERENCE TO RELATED APPLICATION

This application is the National Phase of PCT International Application No. PCT/KR2021/004393, filed on Apr. 8, 2021, which is hereby expressly incorporated by reference into the present application.

BACKGROUND

1. Field

The present disclosure relates to a display apparatus and an image display apparatus including the same, and more particularly, to a display apparatus capable of reducing a transmission period of data transmitted to a plurality of driving devices and an image display apparatus including the same.

2. Description of the Related Art

A display apparatus is an apparatus that displays images. To this end, the display apparatus includes a liquid crystal display panel, an organic light emitting diode panel, etc., and displays images by using a signal applied to a panel.

In recent years, a research of a display apparatus using a light emitting diode has been conducted for large-screen image display.

In order to drive a plurality of light emitting diodes, a plurality of driving devices is used, and command data or image data should be transmitted from each driving device to an adjacent driving device.

Meanwhile, as the number of plurality of light emitting diodes increases, that is, as a screen is the is a larger, there disadvantage in that a data transmission period is increased upon data transmission and loss upon the data transmission is increased.

SUMMARY

It is an object of the present disclosure to provide a display apparatus capable of reducing a transmission period of data transmitted to a plurality of driving devices and an image display apparatus including the same.

It is another object of the present disclosure to provide a display apparatus capable of reducing a transmission period of data of a common command transmitted to the plurality of driving devices and an image display apparatus including the same.

It is yet another object of the present disclosure to provide a display apparatus capable of reducing a transmission period of image data transmitted to the plurality of driving devices and an image display apparatus including the same.

It is still yet another object of the present disclosure to provide a display apparatus which can rapidly transmit image data of changed bits without addition of dummy data upon changing the number of bits of the image data and an image display apparatus including the same.

It is still yet another object of the present disclosure to provide a display apparatus which can reduce a wiring length for a clock signal and reduce level-down of the clock signal in the display apparatus and an image display apparatus including the same.

It is still yet another object of the present disclosure to provide a display apparatus which can reduce a wiring length for a control signal and reduce level-down of the control signal in the display apparatus and an image display apparatus including the same.

In accordance with an aspect of the present disclosure, the above and other objects can be accomplished by providing a display apparatus comprising: a plurality of light emitting diodes; and a plurality of driving devices to output driving signals for driving the plurality of light emitting diodes, wherein each of the plurality of driving devices bypasses input common command data and outputs the common command data to an adjacent driving device.

Meanwhile, each of the plurality of driving devices may include a data input terminal, a control input terminal, a clock input terminal, a data output terminal, a control output terminal, and a clock output terminal, and bypass the common command data input through the data input terminal, and output the common command data to the adjacent driving device through the data output terminal.

Meanwhile, each of the plurality of driving devices may include a first shift register to store command data among the data input through the data input terminal, and a second shift register to store image data among the data input through the data input terminal.

Meanwhile, in case in which the common command data is input through the data input terminal, each of the plurality of driving devices may store the common command data in the first shift register through a second path while outputting the common command data to the outside through a first path without passing through the first shift register.

Meanwhile, in case in which individual command data is input through the data input terminal and the individual command data corresponds to identification information, each of the plurality of driving devices may store the individual command data in the first shift register, and in case in which individual command data is input through the data input terminal and the individual command data does not correspond to the identification information, each of the plurality of driving devices may bypass the individual command data and output the individual command data to the adjacent driving device.

Meanwhile, the common command data may include scan setting data for scan setting in the plurality of driving devices.

Meanwhile, a length of the control data input through the control input terminal may be fixed, and a length of the image data input through the data input terminal may be changed.

Meanwhile, each of the plurality of driving devices may output the common command data input into the data input terminal to the adjacent driving device by bypassing the first shift register without passing through the first shift register in case in which a first signal is input into the control input terminal, and output the data input into the data input terminal to the adjacent driving device by bypassing the second shift register in case in which a second signal is input into the control input terminal.

Meanwhile, each of the plurality of driving devices may output a driving signal for driving the light emitting diode based on the image data stored in the second shift register in case in which a third signal is input into the control input terminal after the second signal.

Meanwhile, each of the plurality of driving devices may output first image data of a first number of bits to the adjacent driving device in case in which the input first image data includes the first number of bits, and output second image data of a second number of bits to the adjacent driving device in case in which input second image data includes bits of a second number larger than the first number.

Meanwhile, each of the plurality of driving devices may include a shift register to store the image data among the input data, and output image data corresponding to bits to the adjacent driving device without adding dummy bits to the image data in case in which the number of bits of the image data is less than the number of shift registers.

Meanwhile, in case in which the number of bits of the input image data is changed, each of the plurality of driving devices may store the image data in the shift register therein and output the image data having the changed bits to the adjacent driving device by passing through the shift register.

Meanwhile, each of the plurality of driving devices may further include a scan switching element to switch based on a scan signal for driving the plurality of light emitting diodes, and a data switching element to switch based on a data signal, and drive the scan switching element based on the clock signal input through the clock input terminal and drive the data switching element based on the image data input through the data input terminal.

Meanwhile, each of the plurality of driving devices may output the driving signal flowing on the data switching element, and drive the light emitting diode.

Meanwhile, the plurality of light emitting diodes may be disposed on a first surface of a circuit board, and the plurality of driving devices may be disposed on a second surface of the circuit board.

Meanwhile, the display apparatus and the image display apparatus including the same may further include host device to output the common command data to the plurality of driving devices.

Meanwhile, in accordance with another aspect of the present disclosure, the above and other objects can be accomplished by providing a display apparatus and an image display apparatus including the same, comprising: a plurality of light emitting diodes; and a plurality of driving devices to output driving signals for driving the plurality of light emitting diodes, wherein each of the plurality of driving devices outputs first image data of a first number of bits to the adjacent driving device in case in which the input first image data includes the first number of bits, and outputs second image data of a second number of bits to the adjacent driving device in case in which input second image data includes bits of a second number larger than the first number.

Meanwhile, each of the plurality of driving devices may include a shift register to store image data among input data, and output, in case in which the number of bits of the image data is less than the number of shift registers, the image data corresponding to the bits to the adjacent driving device without adding dummy bits to the image data.

Meanwhile, in case in which the number of bits of the input image data is changed, each of the plurality of driving devices may store the image data in the shift register therein and output the image data having the changed bits to the adjacent driving device by passing through the shift register.

Meanwhile, each of the plurality of driving devices may include a data input terminal, a control input terminal, a clock input terminal, a data output terminal, a control output terminal, and a clock output terminal, and output first image data of a first number of bits to the adjacent driving device through the data output terminal in case in which first image data input through a data input terminal includes the first number of bits, and output second image data of a second number of bits to the adjacent driving device through the data output terminal in case in which second image data input through the data input terminal includes bits of a second number larger than the first number.

Effects of the Disclosure

According to an embodiment of the present disclosure, a display apparatus and an image display apparatus including the same include a plurality of light emitting diodes, and a plurality of driving devices to output driving signals for driving the plurality of light emitting diodes, and each of the plurality of driving devices bypasses input common command data and outputs the common command data to an adjacent driving device. Accordingly, a transmission period of data transmitted to the plurality of driving devices can be reduced. In particular, the transmission period of the common command data transmitted to the plurality of driving devices can be reduced.

Meanwhile, each of the plurality of driving devices includes a data input terminal, a control input terminal, a clock input terminal, a data output terminal, a control output terminal, and a clock output terminal, and can bypass the common command data input through the data input terminal and output the common command data to the adjacent driving device through the data output terminal. Accordingly, a wiring length for a clock signal can be reduced and level-down of the clock signal can be reduced in the display apparatus. Accordingly, a wiring length for a clock signal can be reduced and level-down of the clock signal can be reduced in the display apparatus.

Meanwhile, each of the plurality of driving devices can include a first shift register to store command data among data input through the data input terminal and a second shift register to store image data among data input through the data input terminal. Accordingly, paths of the command data and the image data can be separated.

Meanwhile, in case in which the common command data is input through the data input terminal, each of the plurality of driving devices can store the common command data in the first shift register r through a second path while outputting the common command data to the outside through a first path without passing through the first shift register. Accordingly, a transmission period of the common command data transmitted to the plurality of driving devices can be reduced.

Meanwhile, in case in which individual command data is input through the data input terminal and the individual command data corresponds to identification information, each of the plurality of driving devices may store the individual command data in the first shift register, and in case in which individual command data is input through the data input terminal and the individual command data does not correspond to the identification information, each of the plurality of driving devices may bypass the individual command data and output the individual command data to the adjacent driving device. Accordingly, the transmission period of the common command data transmitted to the plurality of driving devices can be reduced.

Meanwhile, the common command data may include scan setting data for scan setting in the plurality of driving devices. Accordingly, the same scan setting can be rapidly performed in the plurality of driving devices.

Meanwhile, length of the control data input through the control input terminal may be fixed, and a length of the image data input through the data input terminal may be variable. Accordingly, the transmission period of the image data transmitted to the plurality of driving devices can be reduced.

Meanwhile, each of the plurality of driving devices may output the common command data input into the data input terminal to the adjacent driving device by bypassing the first shift register without passing through the first shift register in case in which a first signal is input into the control input terminal, and output the data input into the data input terminal to the adjacent driving device by bypassing the second shift register in case in which a second signal is input into the control input terminal. Accordingly, the transmission period of common the command data transmitted to the plurality of driving devices can be reduced.

Meanwhile, each of the plurality of driving devices may output a driving signal for driving the light emitting diode based on the image data stored in the second shift register in case in which a third signal is input into the control input terminal after the second signal. Accordingly, an image based on the image data can be displayed.

Meanwhile, each of the plurality of driving devices may output first image data of a first number of bits to the adjacent driving device in case in which the input first image data includes the first number of bits, and output second image data of a second number of bits to the adjacent driving device in case in which input second image data includes bits of a second number larger than the first number. Accordingly, the transmission period of the image data transmitted to the plurality of driving devices can be reduced.

Meanwhile, each of the plurality of driving devices may include a shift register to store the image data among the input data, and output image data corresponding to bits to the adjacent driving device without adding dummy bits to the image data in case in which the number of bits of the image data is less than the number of shift registers. Accordingly, in case in which the number of bits of the image data is changed, the image data of the changed bits can be rapidly transmitted without adding dummy data.

Meanwhile, in case in which the number of bits of the input image data is changed, each of the plurality of driving devices may store the image data in the shift register therein and output the image data having the changed bits to the adjacent driving device by bypassing the shift register. Accordingly, in case in which the number of bits of the image data is changed, the image data of the changed bits can be rapidly transmitted without adding dummy data.

Meanwhile, each of the plurality of driving devices may further include a scan switching element to switch based on a scan signal for driving the plurality of light emitting diodes, and a data switching element to switch based on a data signal, and may drive the scan switching element based on the clock signal input through the clock input terminal and drive the data switching element based on the image data input through the data input terminal. Accordingly, the image based on the image data can be displayed.

Meanwhile, each of the plurality of driving devices may output the driving signal flowing on the data switching element, and drive the light emitting diode. Accordingly, the image based on the image data can be displayed.

Meanwhile, the plurality of light emitting diodes may be disposed on a first surface of a circuit board, and the plurality of driving devices may be disposed on a second surface of the circuit board. Accordingly, heat emission by the light emitting diode and heat emission by the plurality of driving devices can be separated.

Meanwhile, the display apparatus and the image display apparatus including the same according to embodiments of the present disclosure may further include a host device that outputs the common command data to the plurality of driving devices. Accordingly, the common command data, the image data, etc., can be transmitted to each driving device.

Meanwhile, a display apparatus and an image display apparatus including the same according to another embodiment of the present disclosure include a plurality of light emitting diodes and a plurality of driving devices to output driving signals for driving the plurality of light emitting diodes, and each of the plurality of driving devices outputs first image data of a first number of bits to an adjacent driving device in case in which input first image data includes the first number of bits and outputs second image data of a second number of bits to the adjacent driving device in case in which input second image data includes bits of a second number larger than the first number. Accordingly, the transmission period of the image data transmitted to the plurality of driving devices can be reduced. In particular, in case in which the number of bits of the image data is changed, the image data of the changed bits can be rapidly transmitted without adding dummy data.

Meanwhile, each of the plurality of driving devices may include a shift register to store the image data among the input data, and output image data corresponding to bits to the adjacent driving device without adding dummy bits to the image data in case in which the number of bits of the image data is less than the number of shift registers. Accordingly, in case in which the number of bits of the image data is changed, the image data of the changed bits can be rapidly transmitted without adding dummy data.

Meanwhile, in case in which the number of bits of the input image data is changed, each of the plurality of driving devices may store the image data in the shift register therein and output the image data having the changed bits to the adjacent driving device by bypassing the shift register. Accordingly, in case in which the number of bits of the image data is changed, the image data of the changed bits can be rapidly transmitted without adding dummy data.

Meanwhile, each of the plurality of driving devices may include a data input terminal, a control input terminal, a clock input terminal, a data output terminal, a control output terminal, and a clock output terminal, and output first image data of a first number of bits to the adjacent driving device through the data output terminal in case in which first image data input through a data input terminal includes the first number of bits, and output second image data of a second number of bits to the adjacent driving device through the data output terminal in case in which second image data input through the data input terminal includes bits of a second number larger than the first number. Accordingly, in case in which the number of bits of the image data is changed, the image data of the changed bits can be rapidly transmitted without adding dummy data.

BRIEF DESCRIPTION OF THE DRAWINGS

FIGS. 9B to 10C are diagrams referred to in the description of FIG. 9A;

DETAILED DESCRIPTION OF THE PREFERRED EMBODIMENTS

Hereinafter, the present disclosure will be described in detail with reference to the accompanying drawings.

The suffixes “module” and “unit” in elements used in description below are given only in consideration of ease in preparation of the specification and do not have specific meanings or functions. Therefore, the suffixes “module” and “unit” may be used interchangeably.

Figure 1:
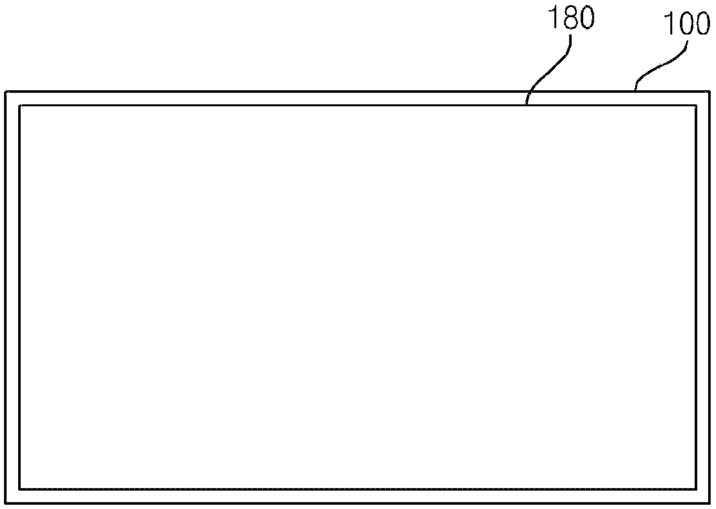
FIG. 1 is a diagram illustrating an image display apparatus according to an embodiment of the present disclosure.

FIG. 1 is a diagram illustrating an image display apparatus according to an embodiment of the present disclosure.

Referring to the drawing, the image display apparatus 100 may include a display apparatus 180.

There is a trend in which a display resolution of the display apparatus 180 increases to 2 K, 4 K, 8 K, 16 K, etc., and accordingly, power consumption of power supplied to the display apparatus 180 increases.

Meanwhile, the display apparatus 180 may include an inorganic light emitting panel (LED panel).

Specifically, the display apparatus 180 may include a plurality of light emitting diodes (LED) and a plurality of driving devices for driving the plurality of light emitting diodes (LED).

Meanwhile, in case in which the plurality of driving devices is used for driving the plurality of light emitting diodes, data communication is performed for data transmission between the plurality of driving devices.

However, as the number of plurality of light emitting diodes increases, that is, as a screen is the larger, there is a disadvantage in that a data transmission period is increased upon data transmission and loss upon the data transmission is increased.

In order to solve the disadvantage, the display apparatus 180 in the image display apparatus 100 according to an embodiment of the present disclosure includes a plurality of light emitting diodes LED1 to LEDk, and a plurality of driving devices DR1 to DRn outputting driving signals for driving the plurality of light emitting diodes LED1 to LEDk, and each of the plurality of driving devices DR1 to DRn bypasses input common command data CCD and outputs the common command data to an adjacent driving device. Accordingly, a transmission period of data transmitted to the plurality of driving devices DR1 to DRn can be reduced. In particular, the transmission period of the common command data CCD transmitted to the plurality of driving devices DR1 to DRn can be reduced.

Meanwhile, a display apparatus 180 in an image display apparatus 100 according to another embodiment of the present disclosure includes a plurality of light emitting diodes LED1 to LEDk and a plurality of driving devices DR1 to DRn driving outputting signals for driving the plurality of light emitting diodes LED1 to LEDk, and each of the plurality of driving devices DR1 to DRn outputs first image data IMD of a first number of bits to an adjacent driving device in case in which input first image data IMD includes the first number of bits and outputs second image data IMD of a second number of bits to the adjacent driving device in case in which input second image data IMD includes bits of a second number larger than the first number. Accordingly, a transmission period of the image data IMD transmitted to the plurality of driving devices DR1 to DRn can be reduced. In particular, in case in which the number of bits of the image data IMD is changed, the image data IMD of the changed bits can be rapidly transmitted without adding dummy data.

Meanwhile, as the image display apparatus 100 of FIG. 1, a signage a TV, a monitor, a vehicle display apparatus, a tablet PC, etc., are available.

Figure 2:
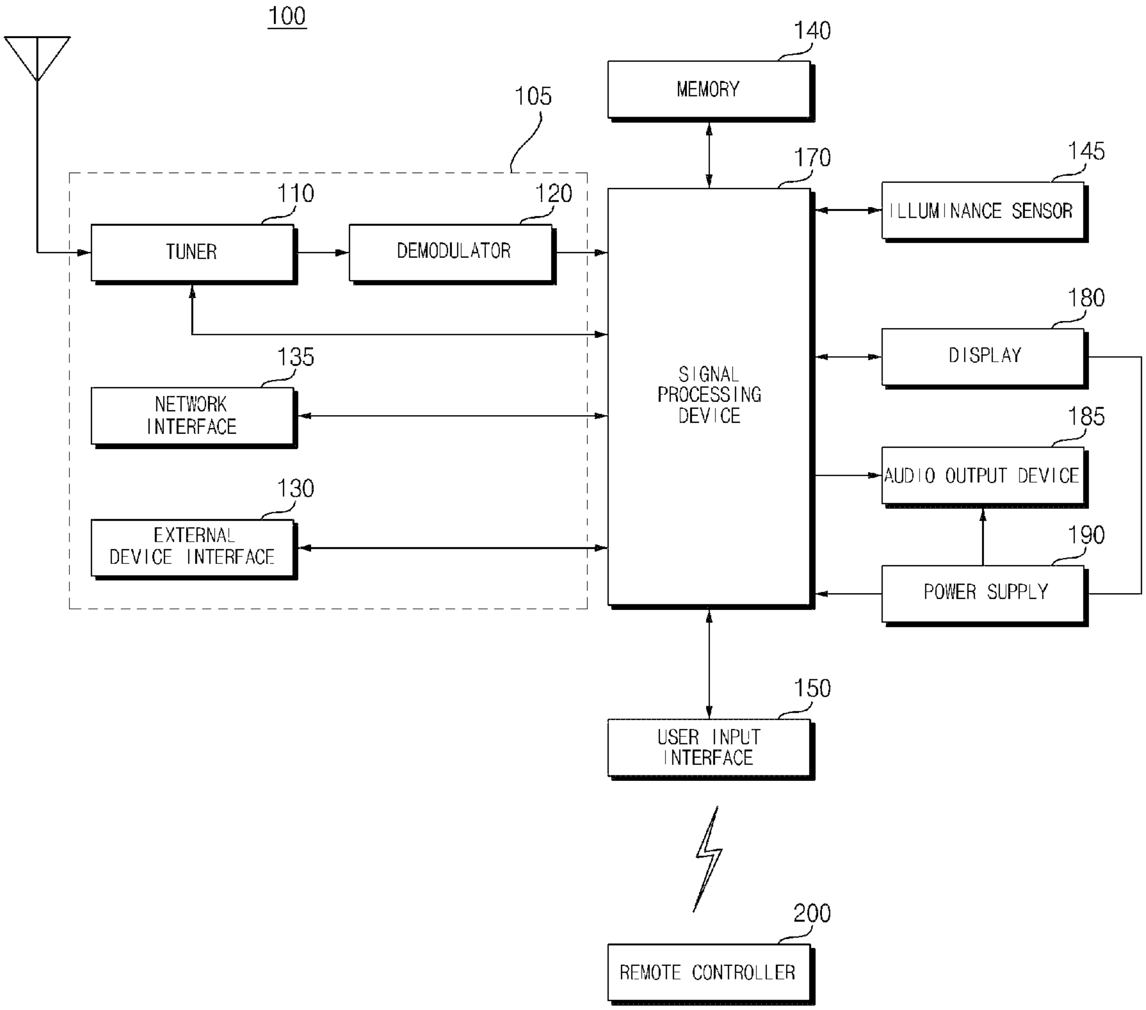
FIG. 2 is an example of an internal block diagram of the image display apparatus of FIG. 1.

FIG. 2 is an example of an internal block diagram of the image display apparatus of FIG. 1.

Referring to FIG. 2, an image display apparatus 100 according to an embodiment of the present disclosure may include an image receiver 105, an external device interface 130, a memory 140, an illuminance sensor 145, a user input interface 150, a signal processing device 170, a display apparatus 180, and an audio output device 185.

The image receiver 105 may comprise a tuner 110, a demodulator 120, a network interface 135, and an external device interface 130.

Meanwhile, unlike the drawing, the image receiver 105 may comprise only the tuner 110, the demodulator 120, and the external device interface 130. That is, the network interface 135 may not be comprised.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

Meanwhile, the tuner 110 can comprise a plurality of tuners for receiving broadcast signals of a plurality of channels. Alternatively, a single tuner that simultaneously receives broadcast signals of a plurality of channels is also available.

The demodulator 120 receives the converted digital IF signal DIF from the a tuner 110 and performs demodulation operation.

The demodulator 120 may perform demodulation and channel decoding and then output a stream signal TS. At this time, the stream signal may be a demultiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display device 180 and outputs audio to the audio output device 185.

The external device interface 130 may transmit or receive data with a connected external apparatus (not shown), e.g., a set-top box 50. To this end, the external device interface 130 may comprise an A/V input and output device (not shown).

The external device interface 130 may be connected to external apparatuses such as a digital versatile disk (DVD), a Blu ray, a game machine, a camera, a camcorder, a computer (laptop), a set-top box, and a USB wiredly/wirelessly, and may perform an input/output operation with the external apparatus.

The A/V input and output device may receive image and audio signals from an external apparatus. Meanwhile, a wireless communication device (not shown) may perform short-range wireless communication with other electronic apparatus.

Through the wireless communication device (not shown), the external device interface 130 may exchange data with an adjacent mobile terminal (not shown). In particular, in a mirroring mode, the external device interface 130 may receive device information, executed application information, application image, and the like from the mobile terminal (not shown).

The network interface 135 provides an interface for connecting the image display apparatus 100 to a wired/wireless network comprising the Internet network. For example, the network interface 135 may receive, via the network, content or data provided by the Internet, a content provider, or a network operator.

Meanwhile, the network interface 135 may comprise a wireless communication device (not shown).

The memory 140 may store a program for each signal processing and control in the signal processing device 170, and may store a signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory 140 is provided separately from the signal processing device 170, the scope of the present disclosure is not limited thereto. The memory 140 may be comprised in the signal processing device 170.

The illuminance sensor 145 may sense an illuminance around the image display apparatus 100. A sensed illuminance value may be delivered to the signal processing device 170.

The user input interface 150 transmits a signal input by the user to the signal processing device 170 or transmits a signal from the signal processing device 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external device interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a signal-processed image signal.

The image signal processed by the signal processing device 170 is input to the display device 180, and may be displayed as an image corresponding to the image signal. In addition, the image signal processed by the signal processing device 170 may be input to the external output apparatus through the external device interface 130.

The audio signal processed by the signal processing device 170 may be output to the audio output device 185 as an audio signal. In addition, audio signal processed by the signal processing device 170 may be input to the external output apparatus through the external device interface 130.

Although not shown in FIG. 2, the signal processing device 170 may comprise a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 can control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display device 180 to display an image. At this time, the image displayed on the display device 180 may be a still image or a moving image, and may be a 2D image or a 3D image.

Meanwhile, the signal processing device 170 may display a certain object in an image displayed on the display device 180. For example, the object may be at least one of a connected web screen (newspaper, magazine, etc.), an electronic program guide (EPG), various menus, a widget, an icon, a still image, a moving image or a text.

Meanwhile, the signal processing device 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display device 180 corresponding to a user position can be determined.

Meanwhile, the signal processing device 170 may control a level of a scan signal applied to a scan switching element for driving the plurality of light emitting diodes or a level of a data signal applied to a data switching element for driving the plurality of light emitting diodes to be changed, based on the illuminance value sensed by the illuminance sensor 145.

In particular, the signal processing device 170 may control the level of the scan signal applied to the scan switching element or the level of the data signal applied to the data switching element to be decreased as a surrounding illuminance is the higher.

The display apparatus 180 converts an image signal, data, an OSD signal, and a control signal processed by the signal processing device 170 or an image signal, data, and a control signal received by the external device interface 130 to generate the driving signals.

Meanwhile, the display device 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which can be implemented in the form of a system on chip (SOC), a display device 180 for displaying an image, and an audio output device 185 for outputting an audio.

Specifically, the power supply 190 may include a converter converting alternating current (AC) voltage into direct current (DC) voltage, and a dc/dc converter converting a level of the DC voltage.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
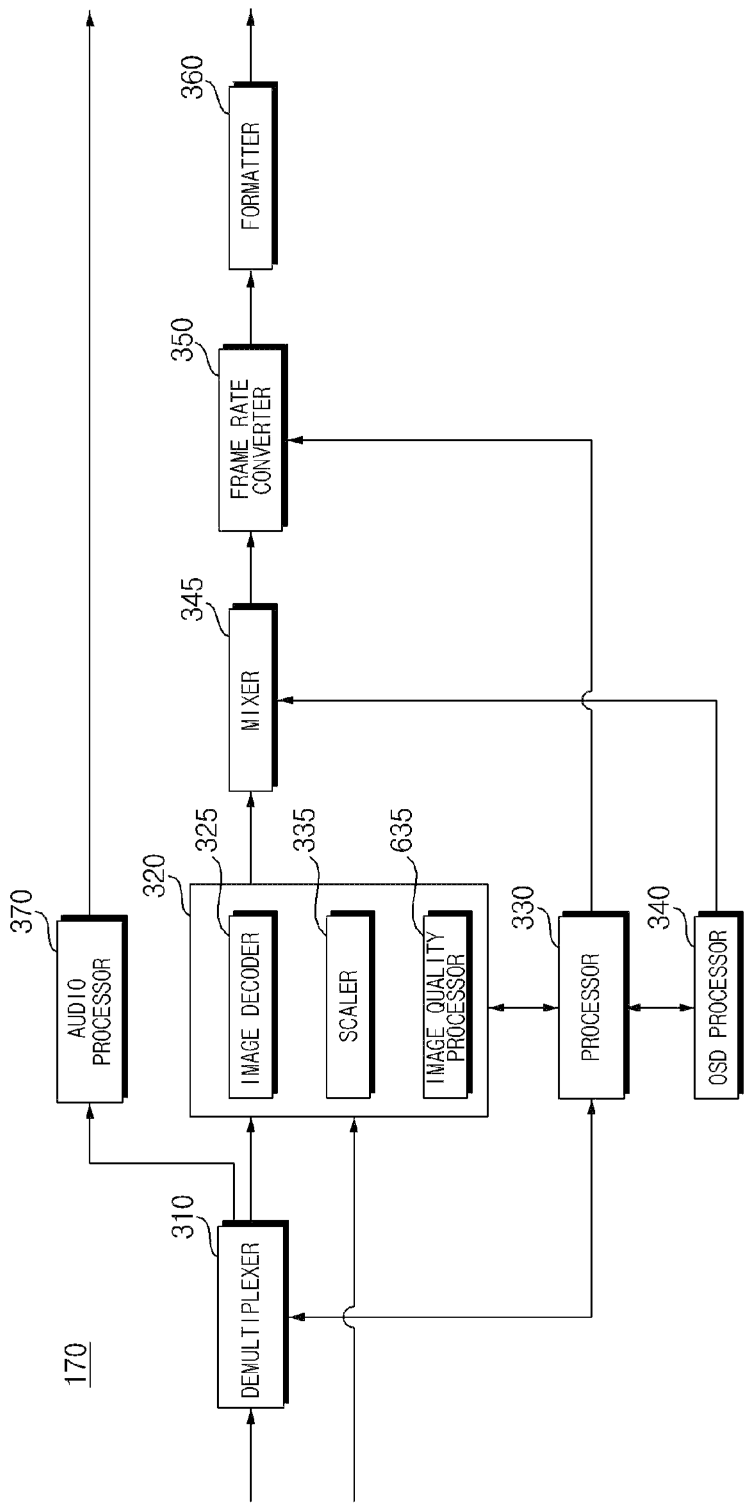
FIG. 3 is an example of an internal block diagram of a signal processing device of FIG. 2.

FIG. 3 is an example of an internal block diagram of a signal processing device of FIG. 2.

Referring to the drawing, the signal processing device 170 according to an embodiment of the present disclosure may comprise a demultiplexer 310, an image processor 320, a processor 330, and an audio processor 370. In addition, the signal processing device 170 may further comprise and a data processor (not shown).

The demultiplexer 310 demultiplexes the input stream. For example, in case in which an MPEG-2 TS is input, it can be demultiplexed into image, audio, and data signal, respectively. Here, the stream signal input to the demultiplexer 310 may be a stream signal output from the tuner 110, the demodulator 120, or the external device interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not illustrated), an OSD processor 340, a frame rate converter 350, and a formatter 360.

The image decoder 325 decodes a demultiplexed image signal, and the scaler 335 performs scaling so that the resolution of the decoded image signal can be output from the display device 180.

The image decoder 325 can comprise a decoder of various standards. For example, a 3D image decoder for MPEG-2, H.264 decoder, a color image, and a depth image, and a decoder for a plurality of view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise removal processing of an input image signal, extend a resolution of a gray scale of the input image signal, enhance an image resolution, perform high dynamic range (HDR) based signal processing, vary a frame rate, or process panel characteristics, in particular, an image quality corresponding to an organic light emitting panel.

The OSD processor 340 generates an OSD signal according to a user input or by itself. For example, based on a user input signal, the OSD processor 340 may generate a signal for displaying various information as a graphic or a text on the screen of the display device 180. The generated OSD signal may comprise various data such as a user interface screen of the image display apparatus 100, various menu screens, a widget, and an icon. In addition, the generated OSD signal may comprise a 2D object or a 3D object.

In addition, the OSD processor 340 may generate a pointer that can be displayed on the display, based on a pointing signal input from the remote controller 200. In particular, such a pointer may be generated by a pointing controller, and the OSD processor 240 may comprise the pointing controller (not shown). Obviously, the pointing controller (not shown) may be provided separately from the OSD processor 240.

The frame rate converter (FRC) 350 may convert the frame rate of an input image. Meanwhile, it is also possible that the frame rate converter 350 outputs the input image as it is without separate frame conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the input user interface 150 or an internal program.

In addition, the processor 330 may transmit data to the network interface 135 or to the external device interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may comprise various decoders.

In addition, the audio processor 370 in the signal processing device 170 may process a base, a treble, a volume control, and the like.

The data processor (not shown) in the signal processing device 170 may perform data processing of the demultiplexed data signal. For example, in case in which the demultiplexed data signal is a coded data signal, it can be decoded. The encoded data signal may be electronic program guide information comprising broadcast information such as a start time and an end time of a broadcast program broadcasted on each channel.

Meanwhile, the block diagram of the signal processing device 170 illustrated in FIG. 3 is a block diagram for an embodiment of the present disclosure.

Respective components of the block diagram may be integrated, added, or omitted according to a specification of the signal processing device 170 which is actually implemented.

In particular, the frame rage converter 350 and the formatter 360 may be provided separately apart from the image processor 320.

Figure 4A:
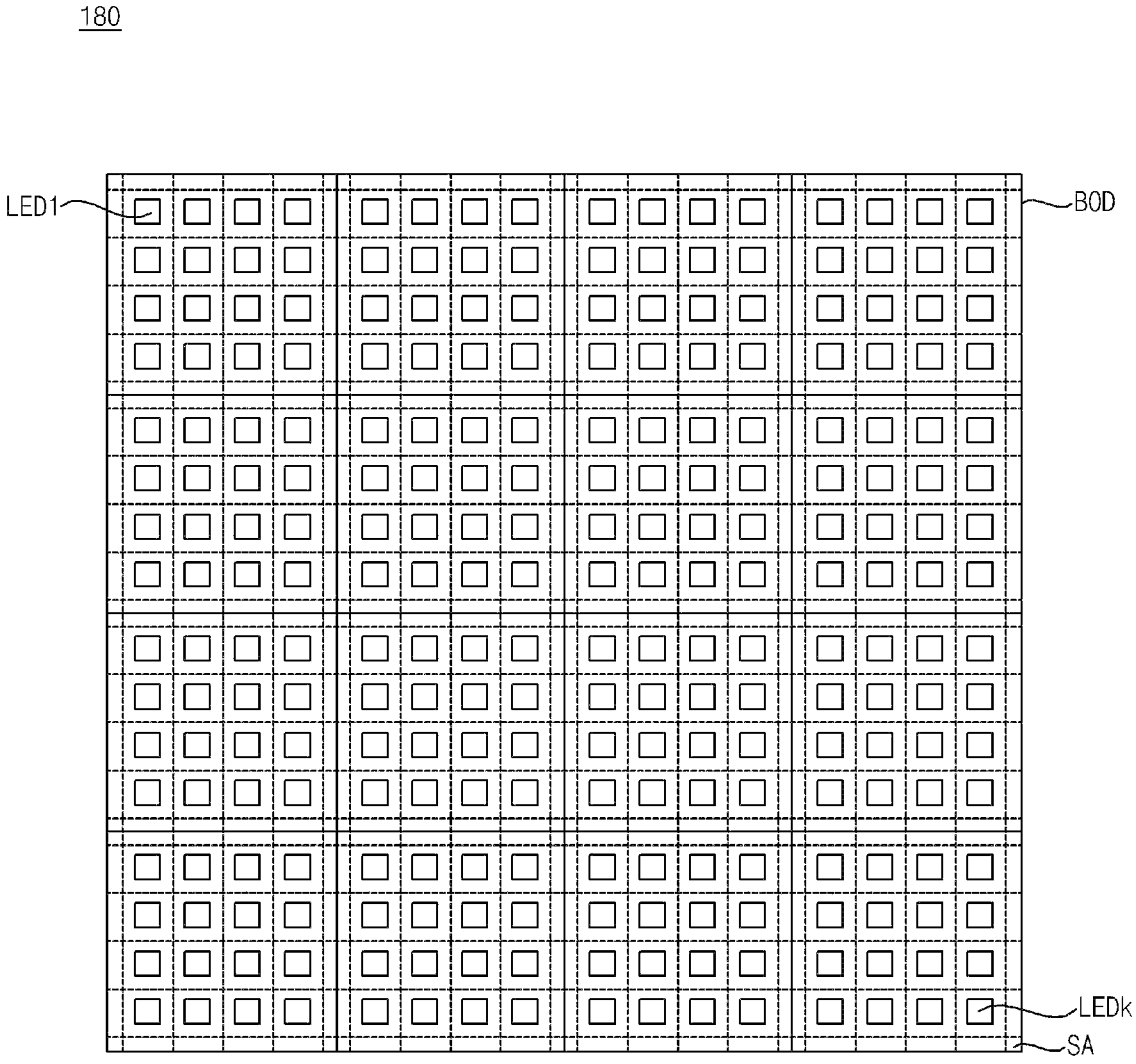
FIG. 4A is a diagram illustrating an example of an array of a plurality of light emitting diodes provided in a display apparatus of FIG. 1.

FIG. 4A is a diagram illustrating an example of an array of a plurality of light emitting diodes provided in a display apparatus of FIG. 1.

Referring to the drawing, the display apparatus 180 may include a circuit board BOD including the plurality of light emitting diodes LED1 to LEDk. In this case, the plurality of light emitting diodes LED1 to LEDk may be micro LEDs.

The plurality of light emitting diodes LED1 to LEDk may be disposed in a first surface SA of the circuit board BOD.

In the drawing, a 16*16 light emitting diode is exemplified, but unlike this, as the resolution increases or as a screen is the larger, the number of light emitting diodes increases.

Figure 4B:
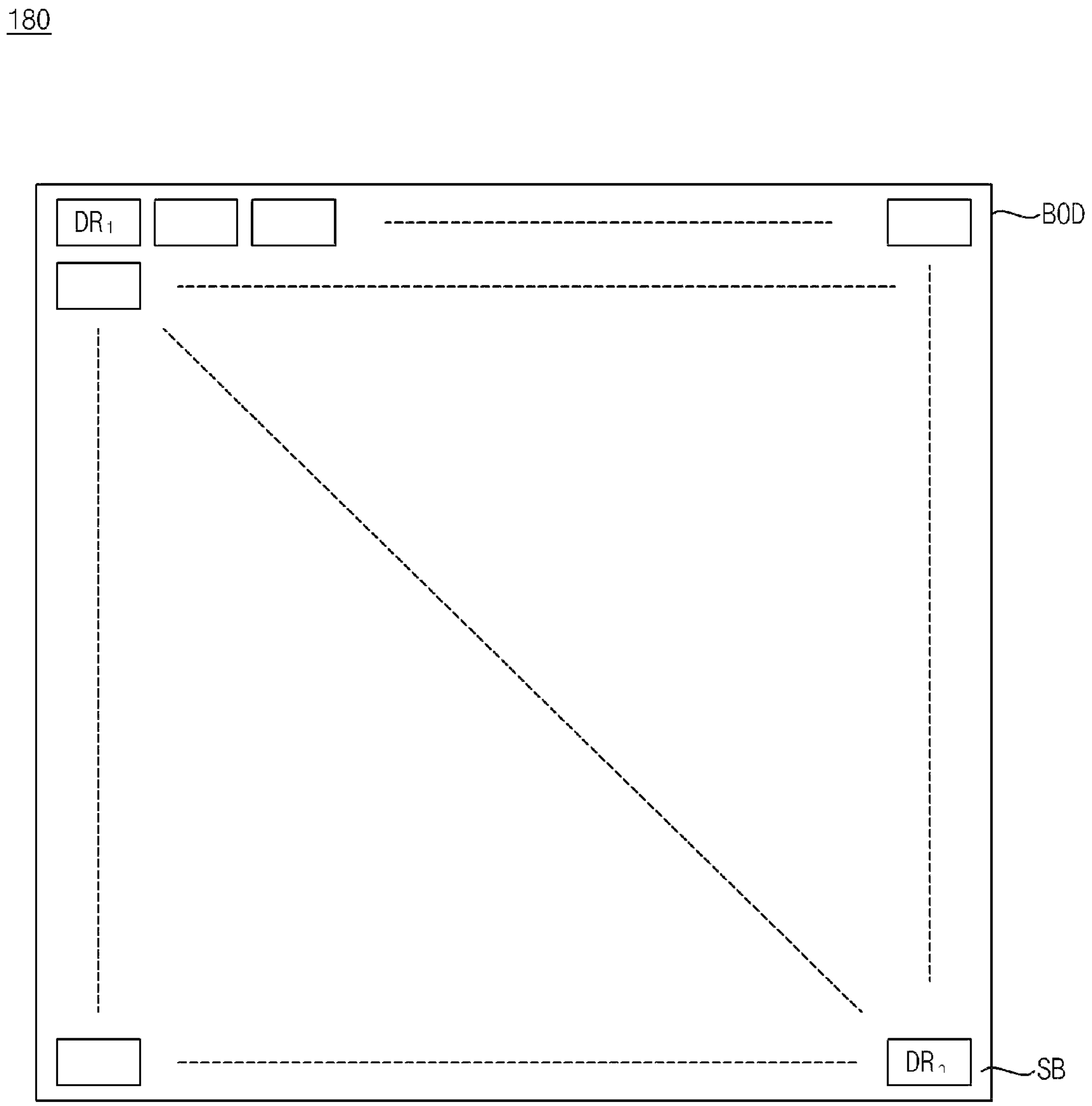
FIG. 4B is a diagram illustrating an example of an array of a plurality of driving devices provided in the display apparatus of FIG. 4A.

FIG. 4B is a diagram illustrating an example of an array of a plurality of driving devices provided in the display apparatus of FIG. 4A.

Referring to the drawing, the display apparatus 180 may include a circuit board BOD including the plurality of driving devices DR1 to DRn.

Each of the plurality of driving devices DR1 to DRn may output driving signals for driving some of the plurality of light emitting diodes LED1 to LEDk disposed in the first surface SA of the circuit board BOD.

The plurality of driving devices DR1 to DRn may be disposed on a second surface SB of the circuit board OBD which is a bottom surface of the first surface SA.

As such, the plurality of light emitting diodes LED1 to LEDk is disposed on the first surface SA of the circuit BOD and the plurality of driving devices DR1 to DRn is disposed on the second surface SB of the circuit board BOD to separate heat emission by the light emitting diode and heat emission by the plurality of driving devices DR1 to DRn.

Figure 5:
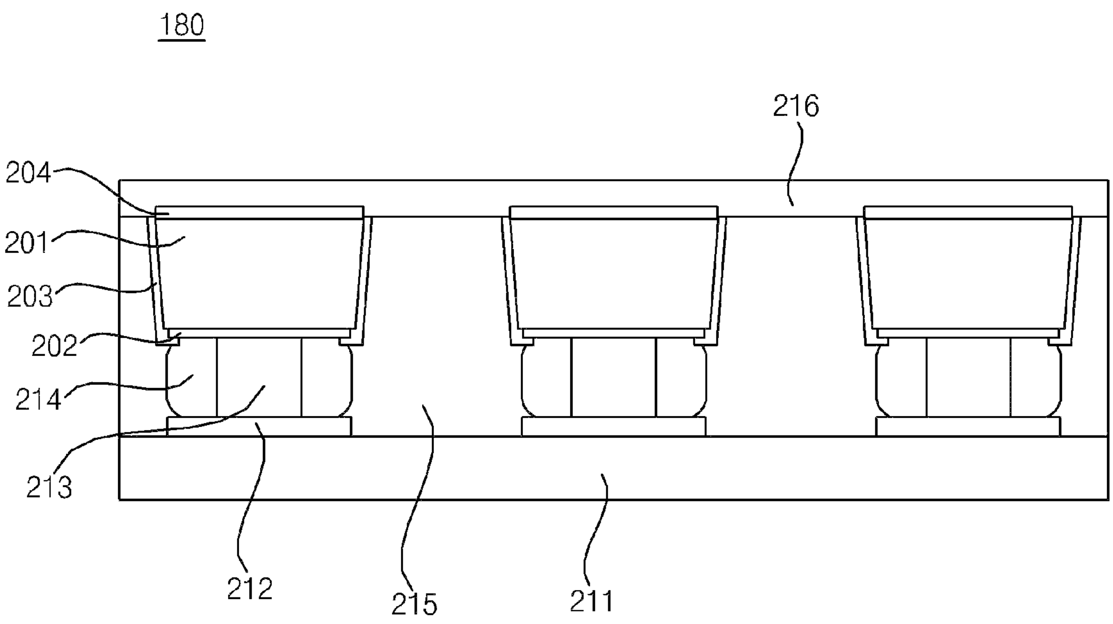
FIG. 5 is a diagram illustrating a cross section of the display apparatus of FIG. 4A.

FIG. 5 is a diagram illustrating a cross section of the display apparatus of FIG. 4A.

Referring to the drawing, a lower wiring 212 may be disposed on a substrate 211 in the circuit board BOD in the display apparatus 180, and a plating layer 214 and an adhesive layer 213 may be disposed on the lower wiring 212.

In particular, the adhesive layers 213 may be disposed between the plating layers 214.

A first electrode 202 may be disposed on the plating layer 214 and the adhesive layer 213, and in this case, the first electrode 202 may be a P electrode.

An epi layer 201 may be disposed on the first electrode 202, and a passivation layer 203 may be disposed around the epi layer 201.

In addition, a second electrode 204 may be disposed on the epi layer 201, and in this case, the second electrode 202 may be an n electrode.

Accordingly, respective light emitting diodes may be formed on the substrate, which include the lower wiring 212, the plating layer 214, the adhesive layer 213, the first electrode 202, the epi layer 201, the passivation layer 203, and the second electrode 204.

Meanwhile, a planarization layer 215 made by a polymer material may be formed between the respective light emitting diodes.

Meanwhile, an upper wiring 216 may be commonly formed on the second electrodes 204 of the respective light emitting diodes.

Figure 6:
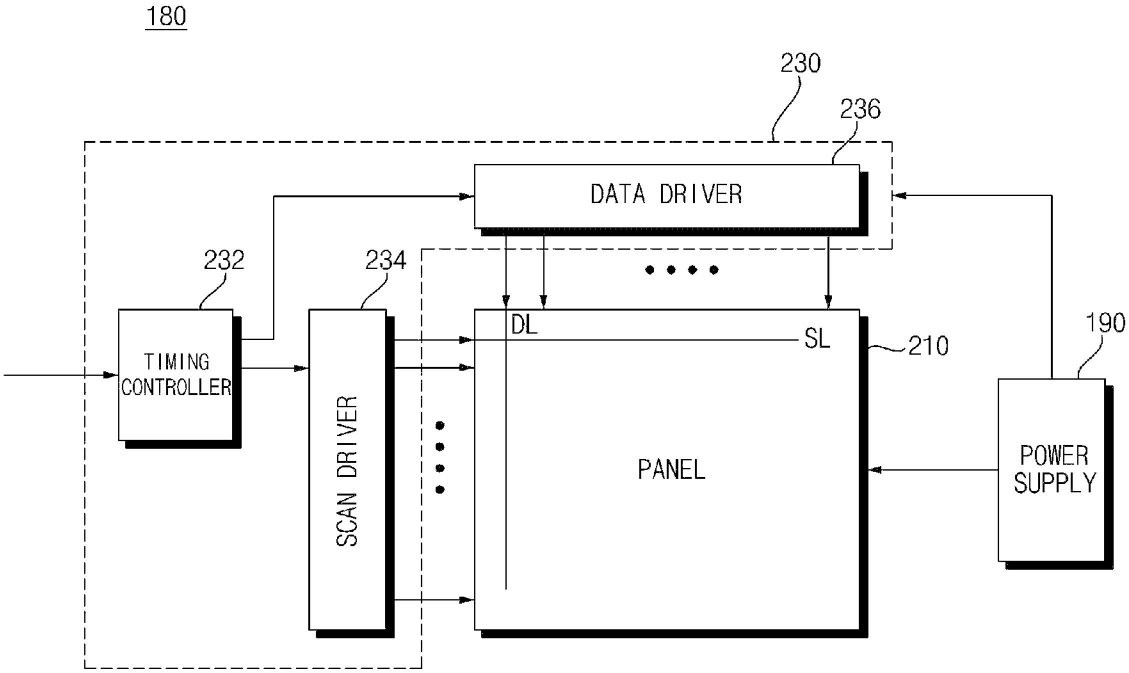
FIG. 6 is an example of an internal block of a display of FIG. 2.

FIG. 6 is an example of an internal block of a display of FIG. 2.

Referring to the drawing, an LED based display apparatus 180 may include an LED panel 210 and a driving circuit 230.

The LED panel 210 may include the plurality of light emitting diodes LED1 to LEDk.

Meanwhile, the LED panel 210 may further include a scan switching element Qa switching based on the scan signal, a data switching element Qb switching based on the data signal, and a capacitor Cst storing a voltage corresponding to the data signal.

The driving circuit 230 drives the LED panel 210 through a control signal and a data signal supplied from the signal processing device of FIG. 2.

To this end, the driving circuit 230 may include a timing controller 232, a scan driver 234, and a data driver 236.

The timing controller 232 receives a control signal, RGB data, and a vertical synchronization signal Vsync from the signal processing device 170 to control the scan driver 234 and the data driver 236 in response to the control signal, and relocate the RGB data and provide the relocated RGB data to the data driver 236.

The scan driver 234 and the data driver 236 supplies the scan signal and the data signal to the LED panel 210 through a scan line SL and a data line DL according to a control of the timing controller 232.

Meanwhile, the driving circuit 230 may further include a scan switching element Qa switching based on the scan signal, a data switching element Qb switching based on the data signal, and a capacitor Cst storing a voltage corresponding to the data signal.

The power supply 190 may supply a driving voltage VDD to the LED panel 210, supply a data voltage to the data driver 236, and supply a scan voltage to the scan driver 234.

Figure 7:
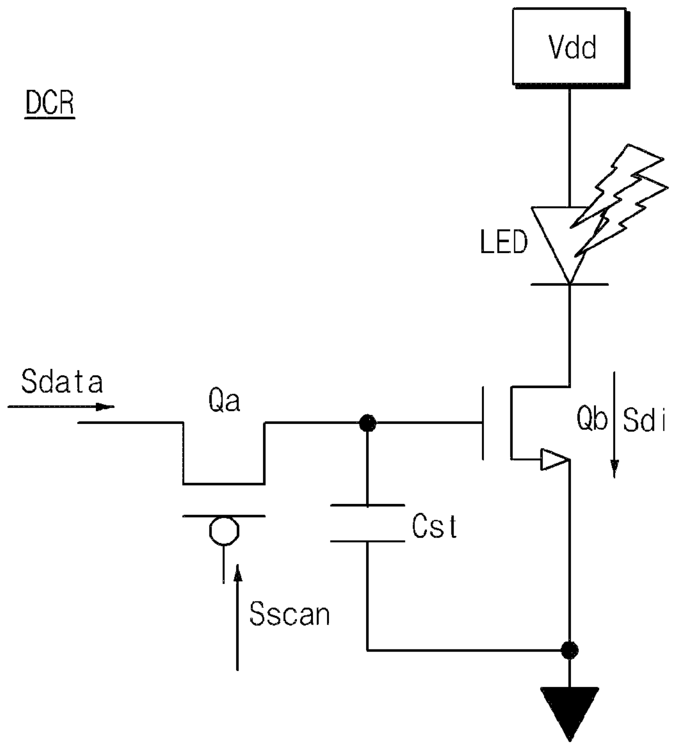
FIG. 7 is a diagram illustrating a diode driving circuit of the light emitting diode of FIG. 4A.

FIG. 7 is a diagram illustrating a diode driving circuit of the light emitting diode of FIG. 4A.

Referring to the drawing, a diode driving circuit DCR for driving each of the light emitting diodes LED1 to LEDk in the LED panel 210 in the display apparatus 180 may be driven by the scan switching element Qa switching based on the scan signal Sscan, the data switching element Qb switching based on the data signal Sdata, and the capacitor Cst storing the voltage corresponding to the data signal.

In case in which the scan switching element Qa is turned on by the scan signal Sscan, the data signal Sdata is delivered to one end of each of the data switching element Qb and the capacitor Cst.

In addition, the data switching element Qb is turned on by the data signal Sdata, and a current Sdi based on the driving voltage Vdd flows to the ground via the LED and the data switching element Qb. In this case, the capacitor Cst stores the data signal Sdata, and allows the data switching element Qb to be turned on for a predetermined time.

Meanwhile, the data signal Sdata may be a PWM based signal or a PAM based signal. That is, according to a pulse width or a pulse size, a current which lows on the LED is changed, and light emitting luminance in the LED is changed.

Figure 8:
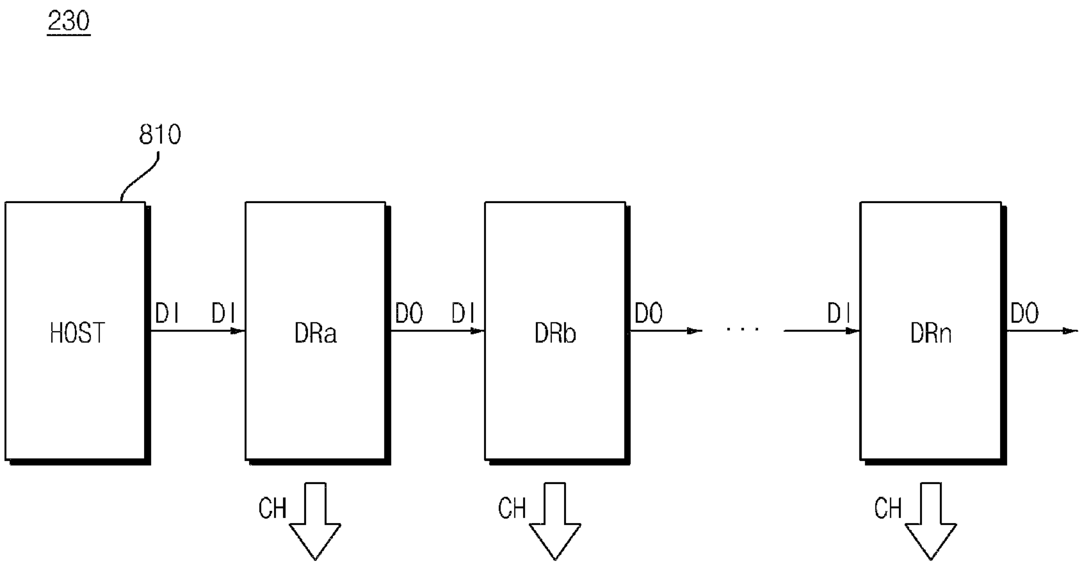
FIG. 8 is a diagram illustrating an example of a driving circuit in the display apparatus of FIG. 4A.

FIG. 8 is a diagram illustrating an example of a driving circuit in the display apparatus of FIG. 4A.

Referring to the drawing, the driving circuit 230 for driving the display apparatus 100 including the plurality of light emitting diodes LED1 to LEDk may include a host device 810 and the plurality of driving devices DR1 to DRn.

The host device 810 may output the data, the control signal, and the clock signal, and each of the plurality of driving devices DR1 to DRn may receive the data, the control signal, and the clock signal.

Each of the driving devices DR1 to DRn may output driving signals for the plurality of light emitting diodes allocated for each driving device by using the input data DI, control signal, and clock signal.

For example, each of the driving devices DR1 to DRn may generate the scan signal Sscan for the switching of the scan switching element Qa based on the input control signal and clock signal, and drive the scan switching element Qa based on the scan signal Sscan.

Meanwhile, each of the driving devices DR1 to DRn may generate the data signal Sdata for the switching of the data switching element Qa based on the input control signal and data DI, and drive the data switching element Qb based on the data signal Sdata.

Meanwhile, each of the driving devices DR1 to DRn may store corresponding image data among the input data DI in the shift register therein and transmit other image data to the adjacent driving device. Accordingly, the image data may be sequentially to the respective driving devices DR1 to DRn.

Figure 9A:
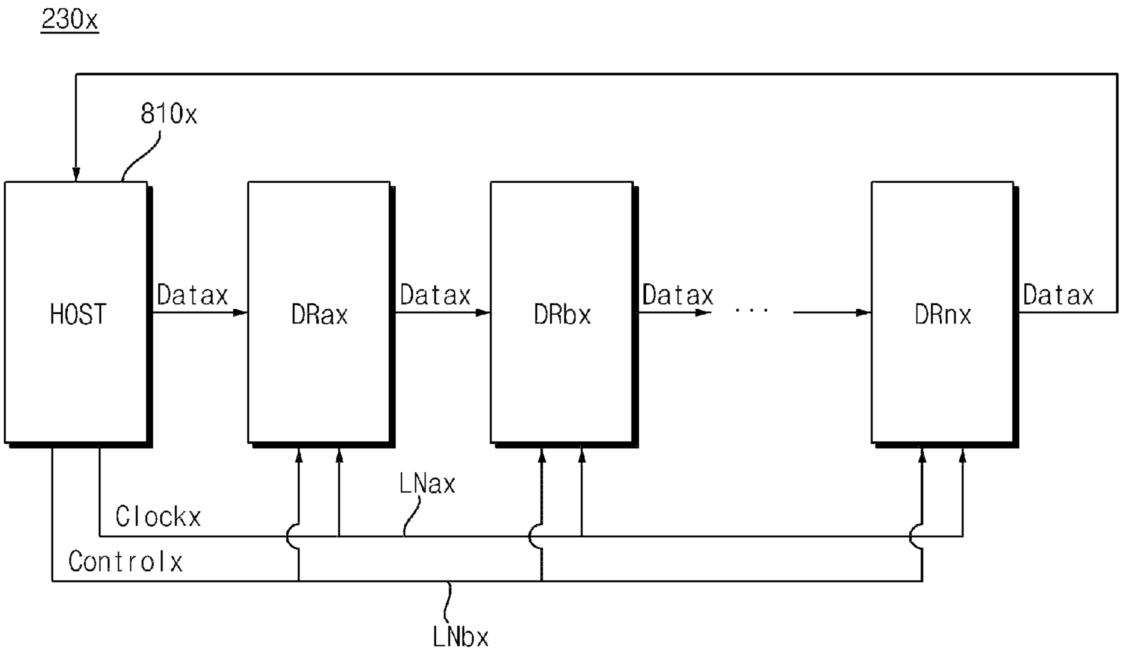
FIG. 9A is a diagram illustrating an example of the driving circuit in the display apparatus related to the present disclosure.

FIG. 9A is a diagram illustrating an example of a driving circuit in a display apparatus related to the present disclosure, and FIGS. 9B to 10C are diagrams referred to in the description of FIG. 9A.

The driving circuit 230*x* of FIG. 9A may include a host device 810*x* and a plurality of driving devices DRax to DRnx.

The host device 810*x* may output the data, the control signal, and the clock signal, and each of the plurality of driving devices DR1x to DRnx may receive the data, the control signal, and the clock signal.

Meanwhile, the control signal and the clock signal are commonly applied to the respective driving devices DR1x to DRnx, and the data is sequentially transmitted via the respective driving devices DR1x to DRnx.

That is, the data from the host device 810*x* may be sequentially delivered to a first driving device DR1x, a second driving device DR2x, and an n-th driving device DRnx by a daisy chain scheme, and each of the driving devices DR1x to DRnx may store the corresponding image data in the shift register SFx therein and sequentially transmit other image data to the adjacent driving device.

That is, each of the driving devices DR1x to DRnx may serve as a repeater device for data transmission as well as a reception device for data reception.

Meanwhile, data output from the n-th driving device DRnx may be transmitted to the host device 810*x*.

Figure 9B:
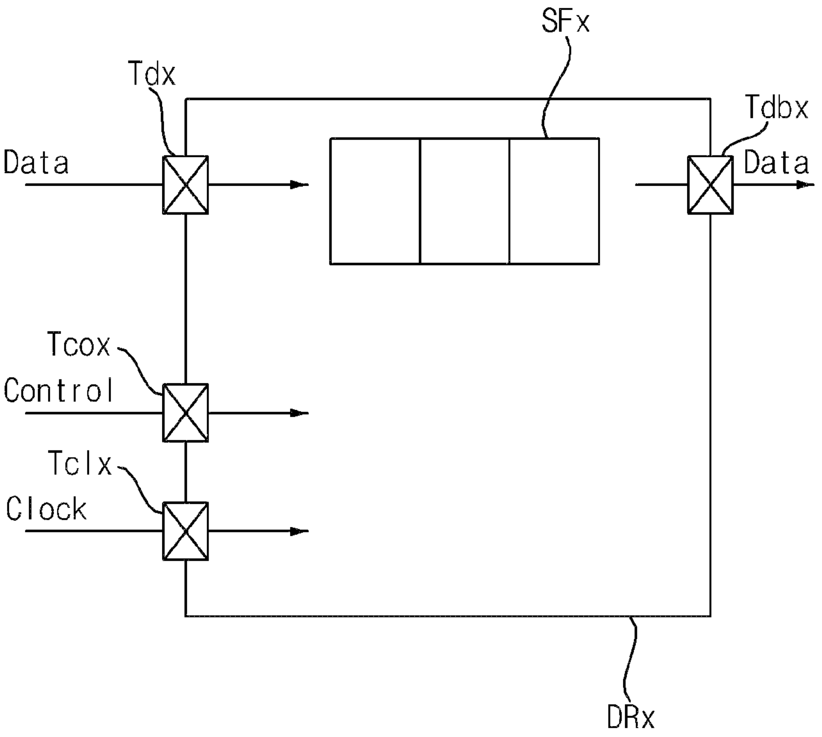

FIG. 9B is an internal block diagram of the driving device DRx in the driving circuit 230*x*.

Referring to the drawing, for a data communication scheme as in FIG. 9A, the driving device DRx in the driving circuit 230*x* of FIG. 9A includes a data input terminal Tdx, a control input terminal Tcox, a clock input terminal Tclx, and a data output terminal Tdbx, and does not include a control output terminal and a clock output terminal.

Since the driving device DRx does not include the control output terminal and the clock output terminal, each of the driving devices DR1x to DRnx receives a common control signal controlx through the control input terminal Tcox and receives a common clock signal clockx through the clock input terminal Tclx.

Accordingly, a wiring LNax for the common control signal controlx is separately required. Meanwhile, as the number of driving devices DR1x to DRn increases, a length of the wiring LNax increases, so there is a disadvantage in that signal loss increases due to an increase in length of the wiring LNax.

Further, a wiring LNbx for the common clock signal clockx is separately required. Meanwhile, as the number of driving devices DR1x to DRn increases, a length of the wiring LNbx increases, so there is a disadvantage in that signal loss increases due to an increase in length of the wiring LNbx.

Meanwhile, the driving device DRx in the driving circuit 230*x* of FIG. 9A may further include the shift register SEx for storing the image data therein, store the image data corresponding to the shift register SFx, and separately transmit image data to the adjacent driving device in sequence.

In this case, lengths of the received image data and the transmitted image data are fixedly set in response to the number of shift registers.

Figure 9C:
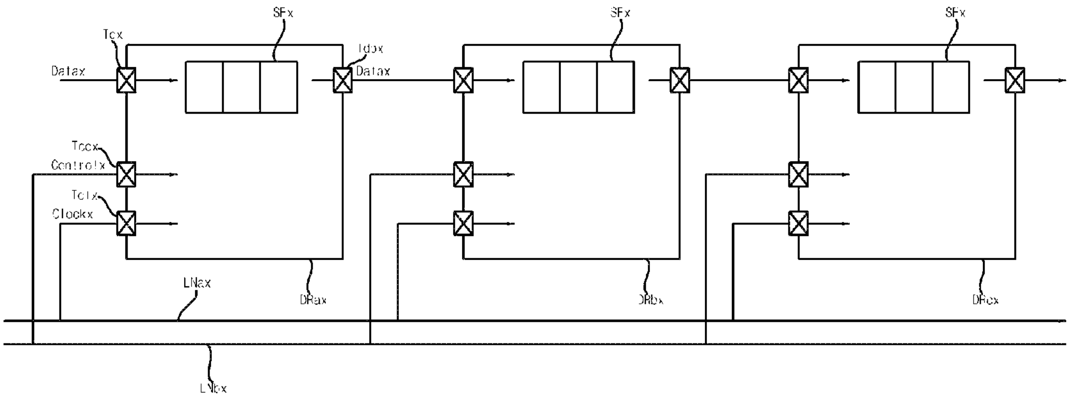

FIG. 9C is a diagram illustrating three driving devices DRax to DRcx in the driving circuit 230*x* of FIG. 9A, and FIGS. 10A to 10C are diagrams referred to in the description of operations of three driving devices of FIG. 9C.

Three driving devices DRax to DRcx include the data input terminal Tdx, the control input terminal Tcox, the clock input terminal Tclx, and the data output terminal Tdbx, and does not include the control output terminal and the clock output terminal, as described above.

In addition, three driving devices DRax to DRcx include the shift register SFx for storing the image data therein.

FIG. 10A is a diagram illustrating that 3-bit image data is output from the host device 810*x* and transmitted to three driving devices DRax to DRcx.

Referring to the drawing, 3-bit image data [1 0 0], [0 1 0], and [0 0 1] are transmitted to the first driving device DRax, the second driving device DRbx, and the third driving device DRcx, respectively.

To this end, the host device 810*x* sequentially outputs bits of 1,0,0, 0,1,0, 0,0,1, x from a time t1 to a time t10.

The bit data is input through the data input terminal Tdx of each of the driving devices DRax to DRcx. In addition, bits of X,1,0, 0,0,1, 0,0,0,1 are sequentially input into DO among three shift registers SFX in the first driving device DRax from the time t1 to the time t10. That is, 1-time time delayed bits are sequentially input.

Likewise, 2-time time delayed bits are sequentially input into D1 among three shift registers SFX in the first driving device DRax.

Likewise, 3-time time delayed bits are sequentially input into D2 among three shift registers SFX in the first driving device DRax.

Likewise, 4-time time delayed bits are sequentially input into DO among three shift registers SFX in the second driving device DRbx.

Likewise, 9-time time delayed bits are sequentially input into D2 among three shift registers SFX in the third driving device DRcx.

Meanwhile, a common control signal is input into the control input terminal Tcox of each of the driving devices DRax to DRcx.

In the drawing, bits of 0,0,0,0,0,0,0,0,1,0 are sequentially exemplified from the time t1 to the time t10. That is, only at a time t9, the bit '1' is represented, and accordingly, at t10 after the time t9, each of the driving devices DRax to DRcx captures data input and stored in the shift register SFX therein.

That is, the shift register SFX in the first driving device DRax captures data Ara1x of [1 0 0], the shift register SFX in the second driving device DRbx captures data Arb1x of [0 1 0], and the shift register SFX in the third driving device DRcx captures data Arc1x of [0 0 1].

FIG. 10B is a diagram illustrating that 2-bit image data is output from the host device 810*x* and transmitted to three driving devices DRax to DRcx.

Referring to the drawing, 3-bit image data [1 1], [1 0], and [0 1] are transmitted to the first driving device DRax, the second driving device DRbx, and the third driving device DRcx, respectively.

To this end, the host device 810*x* sequentially outputs bits of 1,1,0, 1,0,0, 0,1,0,x from the time t1 to the time t10.

Meanwhile, the number of shift registers in each of the driving devices DRax to DRcx is 3, but the number of bits of the transmitted image data is 2, so the host device 810*x* adds and transmits dummy data. Accordingly, the length of the transmitted image data is fixedly set in response to the number of shift registers.

In the drawing, dummy data such as '0' of t3, '0' of t6, and '0' of t9 are exemplified.

The bit data is input through the data input terminal Tdx of each of the driving devices DRax to DRcx. In addition, bits of X,1,1, 0,1,0, 0,0,1,0 are sequentially input into DO among three shift registers SFX in the first driving device DRax from the time t1 to the time t10. That is, 1-time time delayed bits are sequentially input.

Likewise, 2-time time delayed bits are sequentially input into D1 among three shift registers SFX in the first driving device DRax.

Likewise, 3-time time delayed bits are sequentially input into D2 among three shift registers SFX in the first driving device DRax.

Likewise, 4-time time delayed bits are sequentially input into D0 among three shift registers SEX in the second driving device DRbx.

Likewise, 9-time time delayed bits are sequentially input into D2 among three shift registers SFX in the third driving device DRcx.

Meanwhile, a common control signal is input into the control input terminal Tcox of each of the driving devices DRax to DRcx.

In the drawing, bits of 0,0,0,0,0,0,0,0,1,0 are sequentially exemplified from the time t1 to the time t10. That is, only at a time t9, the bit '1' is represented, and accordingly, after the time t9, each of the driving devices DRax to DRcx captures data input and stored in the shift register SFX therein.

That is, the shift register SFX in the first driving device DRax captures data Ara2x of [1 0] except for '0' from [0 1 0], the shift register SFX in the second driving device DRbx captures data Arb2x of [1 0] except for '0' from [0 1 0], and the shift register SFX in the third driving device DRcx captures data Arc2x of [0 1] except for '0' from [0 0 1].

FIG. 10B illustrates that the dummy data is added to a lower bit, and by adding the dummy data, an unnecessary period is consumed and accuracy of data transmission is also lowered.

FIG. 10C is a diagram illustrating that 3-bit command data is output from the host device 810*x* and transmitted to three driving devices DRax to DRcx.

Referring to the drawing, 3-bit command data [0 1 0], [0 1 0], and [0 1 0] are transmitted to the first driving device DRax, the second driving device DRbx, and the third driving device DRcx, respectively. That is, it is illustrated that [0 1 0] which is the common command data is transmitted for each driving device.

To this end, the host device 810*x* sequentially outputs bits of 0,1,0, 0,1,0, 0,1,0,0 from the time t1 to the time t10.

The bit data is input through the data input terminal Tdx of each of the driving devices DRax to DRcx. In addition, bits of X,0,1, 0,0,1, 0,0,1,0 are sequentially input into D0 among three shift registers SFX in the first driving device DRax from the time t1 to the time t10. That is, 1-time time delayed bits are sequentially input.

Likewise, 2-time time delayed bits are sequentially input into D1 among three shift registers SFX in the first driving device DRax.

Likewise, 3-time time delayed bits are sequentially input into D2 among three shift registers SFX in the first driving device DRax.

Likewise, 4-time time delayed bits are sequentially input into D0 among three shift registers SFX in the second driving device DRbx.

Likewise, 9-time time delayed bits are sequentially input into D2 among three shift registers SFX in the third driving device DRcx.

Meanwhile, a common control signal is input into the control input terminal Tcox of each of the driving devices DRax to DRcx.

In the drawing, bits of 0,0,0,0,0,0,0,0,1,0 are sequentially exemplified from the time t1 to the time t10. That is, only at a time t9, the bit '1' is represented, and accordingly, at t10 after the time t9, each of the driving devices DRax to DRcx captures data input and stored in the shift register SFX therein.

That is, the shift register SFX in the first driving device DRax captures data Ara3x of [0 1 0], the shift register SFX in the second driving device DRbx captures data Arb3x of [0 1 0], and the shift register SFX in the third driving device DRcx captures data Arc3x of [0 1 0].

In FIG. 10C, in order to transmit the common command data, the host device 810*x* transmits the command data for each driving device, and accordingly, there is a disadvantage in that as the number of driving devices increases and the number of shift registers in each driving device increases, the transmission period of the common command data is increased.

In an embodiment of the present disclosure, in order to solve the disadvantages in FIGS. 10B and 10C, in case in which the common command data CCD is input, the CCD is bypassed to the adjacent driving device without passing through the shift register, and the length of the data input through the data input terminal Td is changed. This is described with reference to FIG. 11A or below.

Figure 11A:
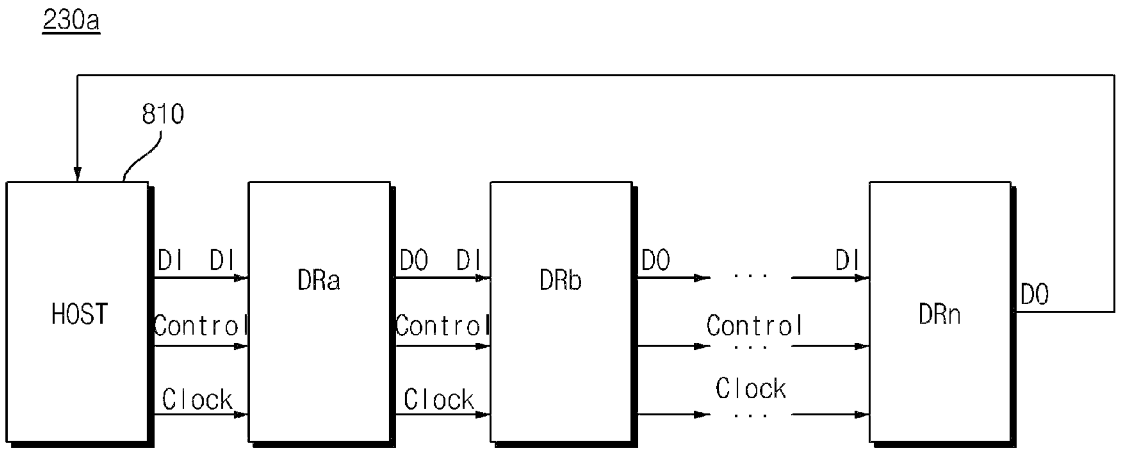
FIG. 11A is a diagram illustrating an example of a driving circuit in a display apparatus according to an embodiment of the present disclosure.

FIG. 11A is a diagram illustrating an example of a driving circuit in a display apparatus according to an embodiment of the present disclosure, and FIGS. 11B to 13B are diagrams referred to in the description of FIG. 11A.

The display apparatus 180 according to an embodiment of the present disclosure may include a plurality of light emitting diodes LED1 to LEDk and a plurality of driving devices DR1 to DRn outputting driving signals for driving the plurality of light emitting diodes LED1 to LEDk.

Referring to FIG. 11A, a driving circuit 230 in the display apparatus 180 according to an embodiment of the present disclosure may include the plurality of driving devices DR1 to DRn and a host device 810. In this case, the host device 810 may correspond to the timing controller 232 of FIG. 6.

Meanwhile, the plurality of driving devices DR1 to DRn may include the scan driver 234, the data driver 236, and the scan switching element Qa switching based on the scan signal, the data switching element Qb switching based on the data signal, and the capacitor Cst storing the voltage corresponding to the data signal in FIG. 6.

Meanwhile, the plurality of driving devices DR1 to DRn may supply the driving signal according to turn-on of the scan switching element Qa and the data switching element Qb therein, i.e., the driving current Sdi to each of the light emitting diodes LED1 to LEDk.

Meanwhile, the host device 810 may output the data, the control signal, and the clock signal, and each of the driving devices DR1 to DRn may receive the data, the control signal, and the clock signal.

Meanwhile, each of the control signal and the clock signal is not commonly input, but input into and from the respective driving devices DR1 to DRn. That is, each of the control signal and the clock signal is sequentially transmitted by passing through the respective driving devices DR1 to DRn.

Meanwhile, the data is sequentially transmitted by passing through the respective driving devices DR1 to DRn.

Figure 11B:
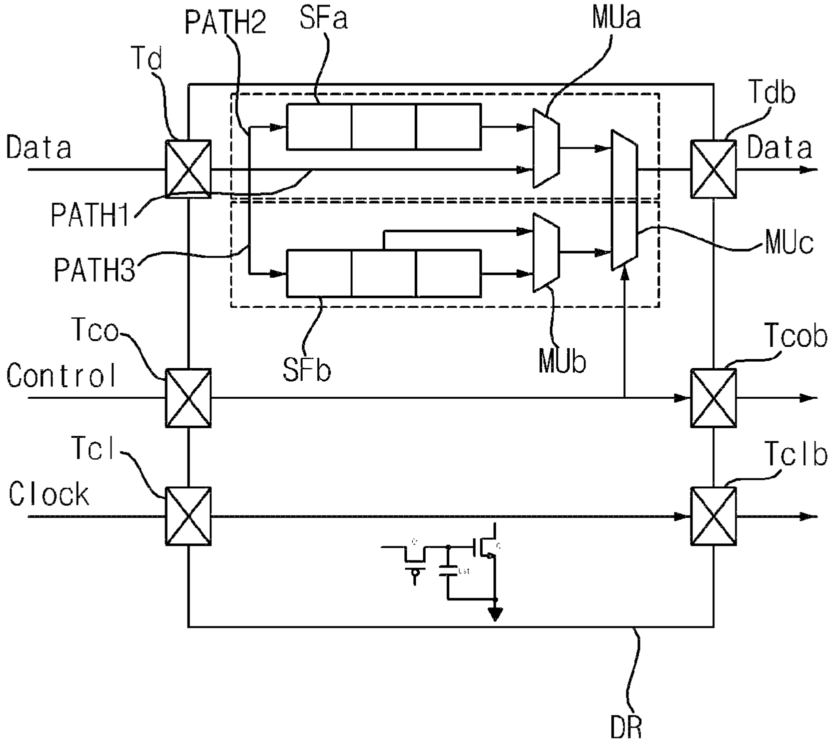
FIGS. 11B to 13B are diagrams referred to in the description of FIG. 11A.

To this end, each of the plurality of driving devices DR1 to DRn includes the data input terminal Td, the control input terminal Tco, the clock input terminal Tcl, the data output terminal Tdb, and the control output terminal Tcob, and the clock output terminal Tclb, as in FIG. 11B.

That is, unlike FIG. 9A, the wiring LNax for the common control signal and the wiring LNbx for the common clock signal are omitted. The wiring length can be reduced, and level-down of the control signal and the clock signal can be reduced.

That is, the data, the control signal, and the clock signal from the host device 810 may be sequentially delivered to the first driving device DR1, the second driving device DR2, and the n-th driving device DRn by the daisy chain scheme, and each of the driving devices DR1 to DRn may store the corresponding data in the shift register SF therein and sequentially transmit other data to the adjacent driving device.

That is, each of the driving devices DR1 to DRn may serve as a repeater device for data transmission as well as a reception device for data reception.

Meanwhile, data output from the n-th driving device DRn may be transmitted to the host device 810.

Meanwhile, the plurality of driving devices DR1 to DRn according to an embodiment of the present disclosure bypasses input common command data CCD and outputs the CCD to the adjacent driving device. Accordingly, a transmission period of data transmitted to the plurality of driving devices DR1 to DRn can be reduced.

Accordingly, the transmission period of the common command data CCD transmitted to the plurality of driving devices DR1 to DRn can be reduced.

Meanwhile, each of the plurality of driving devices DR1 to DRn according to another embodiment of the present disclosure outputs first image data IMD of a first number of bits to the adjacent driving device in case in which the input first image data IMD includes the first number of bits, and outputs second image data IMD of a second number of bits to the adjacent driving device in case in which input second image data IMD includes bits of a second number larger than the first number. Accordingly, a transmission period of the image data IMD transmitted to the plurality of driving devices DR1 to DRn can be reduced. In particular, in case in which the number of bits of the image data IMD is changed, the image data IMD of the changed bits can be rapidly transmitted without adding dummy data.

FIG. 11B is an internal block diagram of the driving device DR in the driving circuit 230*a* of FIG. 11A.

Referring to the drawing, for a data communication scheme as in FIG. 1A, the driving device DR in the driving circuit 230*a* of FIG. 11A may include a data input terminal Td, a control input terminal Tco, a clock input terminal Tcl, a data output terminal Tdb, a control output terminal Tcob, and a clock output terminal Tclb, and may bypass the common command data CCD input through the data input terminal Td and output the CCD to the adjacent driving device through the data output terminal Tdb.

Accordingly, a wiring length for a clock signal can be reduced and level-down of the clock signal can be reduced in the display apparatus 180. Accordingly, a wiring length for a clock signal can be reduced and level-down of the clock signal can be reduced in the display apparatus 180. In particular, even though the number of driving devices DR1 to DRn increases, the signal loss of the clock signal and the control signal can be reduced.

Meanwhile, each of the plurality of driving devices DR1 to DRn can include a first shift register SFa for storing command data among data input through the data input terminal Td and a second shift register SFb for storing image data IMD among data input through the data input terminal Td.

In the drawing, a first path PATH1 for bypassing the common command data input through the data input terminal Td, a second path PATH2 for delivering the command data input through the data input terminal Td to the first shift register SFa, and a third path PATH3 for delivering the image data input through the data input terminal Td to the second shift register SFb are illustrated. Accordingly, paths of the command data, the common command data, and the image data can be separated, respectively. As such, by separating the path of each data, a bandwidth upon data communication can be reduced. Meanwhile, each of the plurality of driving devices DR1 to DRn may include a first multiplexer MUa multiplexing and outputting the common command data of the first path PATH1 and the command data of the second path PATH2, a second multiplexer MUb multiplexing and outputting fixed-length image data and variable-length image data among the image data of the third path PATH3, and a third multiplexer MUc multiplexing and outputting an output of the first multiplexer MUa and an output of the second multiplexer MUb.

For example, each of the plurality of driving devices DR1 to DRn may output individual command data to the adjacent driving device via the first shift register SFa, the first multiplexer MUa, and the third multiplexer MUc according to the second path PATH2.

Specifically, in case in which individual command data is input through the data input terminal Td, if the individual command data corresponds to identification information, each of the plurality of driving devices DR1 to DRn may store the individual command data in the first shift register SFa and if the individual command data does not correspond to the identification information, each of the plurality of driving devices can bypass the individual command data and output the individual command data to the adjacent driving device. Accordingly, the transmission period of the common command data CCD transmitted to the plurality of driving devices DR1 to DRn can be reduced.

As another example, each of the plurality of driving devices DR1 to DRn may output the common command data CCD to the adjacent driving device via the first multiplexer MUa and the third multiplexer MUc according to the first path PATH1.

As yet another example, each of the plurality of driving devices DR1 to DRn may output the fixed-length image data to the adjacent driving device via the second shift register SFb, the second multiplexer MUb, and the third multiplexer MUc according to the third path PATH3.

As still yet another example, each of the plurality of driving devices DR1 to DRn may output the variable-length image data to the adjacent driving device via a part of the second shift register SFb, the second multiplexer MUb, and the third multiplexer MUc according to the third path PATH3.

Accordingly, paths of the command data and the image data IMD can be separated.

Further, paths of the fixed-length image data and the variable-length image data can be separated.

Figure 11C:
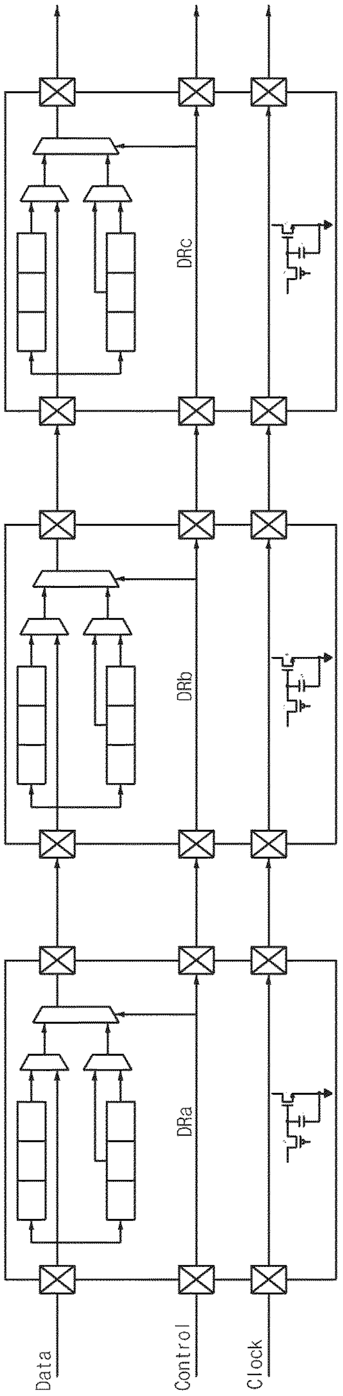

FIG. 11C is a diagram illustrating three driving devices DRa to DRc in the driving circuit 230*a* of FIG. 11A, and FIGS. 12A to 13B are diagrams referred to in the description of operations of three driving devices of FIG. 9C.

Three driving devices DRa to DRc include the data input terminal Td, the control input terminal Tco, the clock input terminal Tcl, the data output terminal Tdb, the control output terminal Tcob, and the clock output terminal Tclb.

In addition, three driving devices DRa to DRc include the first shift register SFa for storing the command data therein and the second shift register SFb for storing the image data.

Figure 12A:
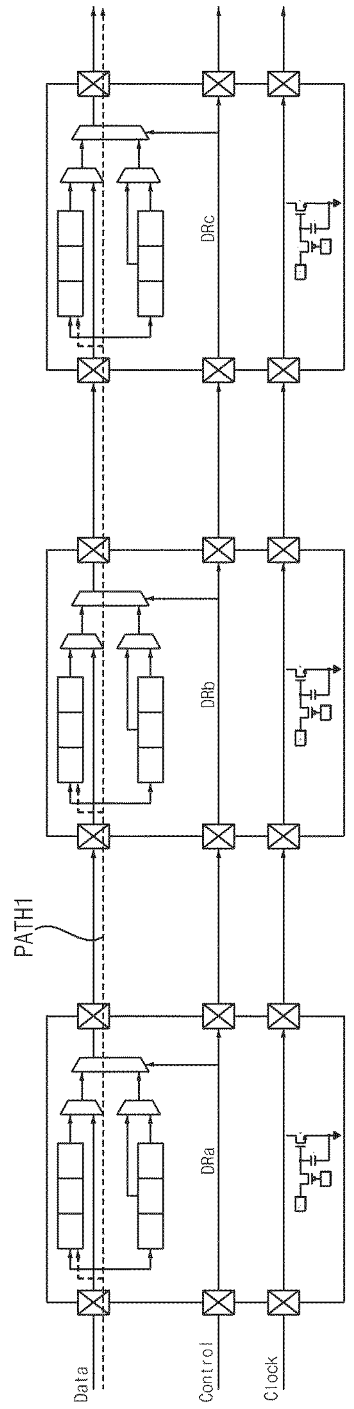

FIGS. 12A and 12B are diagrams illustrating that 3-bit common command data is output from the host device 810 and transmitted to three driving devices DRa to DRc. First, FIG. 12A illustrates that in case in which the common command data CCD is input through the data input terminal Td of each of the plurality of driving devices DRa to DRc, the common command data CCD is stored in the first shift register SFa through the second path PATH2 while the common command data CCD is output to the outside through the first path PATH1 without passing through the first shift register SFa. Accordingly, the transmission period of the common command data CCD transmitted to the plurality of driving devices DR1 to DRn can be reduced.

Meanwhile, the common command data CCD may include scan setting data for scan setting in the plurality of driving devices DR1 to DRn. Accordingly, the same scan setting can be rapidly performed in the plurality of driving devices DR1 to DRn.

Meanwhile, a length of the control data input through the control input terminal Tco may be fixed, and a length of the image data IMD input through the data input terminal Td may be variable. Accordingly, a transmission period of the image data IMD transmitted to the plurality of driving devices DR1~DRn can be reduced.

Meanwhile, in case in which the first signal is input into the control input terminal Tco, each of the plurality of driving devices DR1 to DRn may bypass the common command data CCD input into the data input terminal Td without passing through the first shift register SFa, and output the CCD to the adjacent driving device. Accordingly, the transmission period of the common command data CCD transmitted to the plurality of driving devices DR1 to DRn can be reduced.

Meanwhile, FIG. 12B illustrates that the host device 810 sequentially outputs bits of 1,1,1 from the time t1 to a time t3, and outputs a bit of ‘0’ at t4 as the control signal.

The bit data is input through the control input terminal Tco of each of the driving devices DRax to DRcx.

Meanwhile, the control signal input into the control input terminal Tco of each of the driving devices DRa to DRc may be bypassed and transmitted to the control input terminal of an immediately adjacent driving device through the control output terminal Tcob as in FIG. 12A.

Consequently, the bits of 1,1,1 may be transmitted to the control input terminal Tco of each of the driving devices DRa to DRc at the same timing sequentially from the time t1 to the time t3.

Meanwhile, in case in which the bits of [1 1 1] which are the first signal are input through the control input terminal Tco, each of the driving devices DRa to DRc may determine that the data input into the data input terminal Td is the common command data, and operate.

Meanwhile, FIG. 12B illustrates that the host device 810 sequentially outputs bits of 0,1,0 from the time t1 to a time t3, and outputs the bit of ‘0’ at t4 as the common command data CCD.

The bit data is input through the data input terminal Tdx of each of the driving devices DRa to DRc.

Meanwhile, in case in which the bits of [1 1 1] which are the first signal are input through the control input terminal Tco, each of the driving devices DRa to DRc sets a path of the data input into the data input terminal Td as a first path PATh1 and bypasses the data without passing through the first shift register SFa and outputs the data to the adjacent driving device.

Accordingly, bits of X,0,1,0 are sequentially input into a shift register of D0 among three shift registers SF in the second driving device DRb and the third driving device DRc in addition to the driving device DRa sequentially from the time t1 to the time t4. That is, 1-time time delayed bits are sequentially input.

Likewise, 2-time time delayed bits of X,X,0,1 are sequentially input into a shift register of D1 among three shift registers SF in the second driving device DRb and the third driving device DRc in addition to the first driving device DRa sequentially from the time t1 to the time t4.

Likewise, 3-time time delayed bits of X,X,X,0 are sequentially input into a shift register of D2 among three shift registers SF in the second driving device DRb and the third driving device DRc in addition to the first driving device DRa sequentially from the time t1 to the time t4.

Meanwhile, in case in which the bits of [1 1 1] which are the first signal are input through the control input terminal Tco, each of the driving devices DRa to DRc may set a path of the data input into the data input terminal Td as a second path PATH2 apart from the first path PATh1 and store the common command data CCD.

Meanwhile, at a variation time of the control signal, each of the driving devices DRa to DRc captures data input and stored in the shift register SF therein.

Meanwhile, at the time t4 in case in which the control signal is '0', each of the driving devices DRa to DRc captures data input and stored in the shift register SF therein.

That is, the first shift register SF1 in the first driving device DRa captures data Ara1 of [0 1 0], the first shift register SF1 in the second driving device DRb captures data Arb1 of [0 1 0], and the shift register SF1 in the third driving device DRc captures data Arc1 of [0 1 0].

In case in which FIGS. 12B and 10C are compared, it can be seen that in order to transmit the bits of [0 1 0] which are the common command data CCD, a period from t1 to t10 is required in FIG. 10C, while the period from t1 to t4 is required in FIG. 12B.

As such, according to an embodiment of the present disclosure, each of the plurality of driving devices DR1 to DRn stores the common command data CCD in the first shift register SF1 along the second path while bypassing the CCD along the first path to enable rapid transmission and storage of the common command data CCD.

Further, a wiring length for a clock signal can be reduced and level-down of the clock signal can be reduced in the display apparatus 180. Accordingly, a wiring length for a clock signal can be reduced and level-down of the clock signal can be reduced in the display apparatus 180.

Meanwhile, each of the plurality of driving devices DR1 to DRn may output first image data IMD of a first number of bits to the adjacent driving device in case in which the input first image data IMD includes the first number of bits, and output second image data IMD of a second number of bits to the adjacent driving device in case in which input second image data IMD includes bits of a second number larger than the first number.

Accordingly, a transmission period of the image data IMD transmitted to the plurality of driving devices DR1 to DRn can be reduced.

Meanwhile, each of the plurality of driving devices DR1 to DRn may include a shift register SFb for storing the image data IMD among the input data, and output image data IMD corresponding to bits to the adjacent driving device without adding dummy bits to the image data IMD in case in which the number of bits of the image data IMD is less than the number of shift registers SFb. Accordingly, in case in which the number of bits of the image data IMD is changed, the image data IMD of the changed bits can be rapidly transmitted without adding dummy data.

Meanwhile, in case in which the number of bits of the input image data IMD is changed, each of the plurality of driving devices DR1 to DRn may store the image data IMD in the shift register SFb therein and output the image data IMD having the changed bits to the adjacent driving device via the shift register SFb. Accordingly, in case in which the number of bits of the image data IMD is changed, the image data IMD of the changed bits can be rapidly transmitted without adding dummy data. This is described with reference to FIG. 13A or below.

Figure 13A:
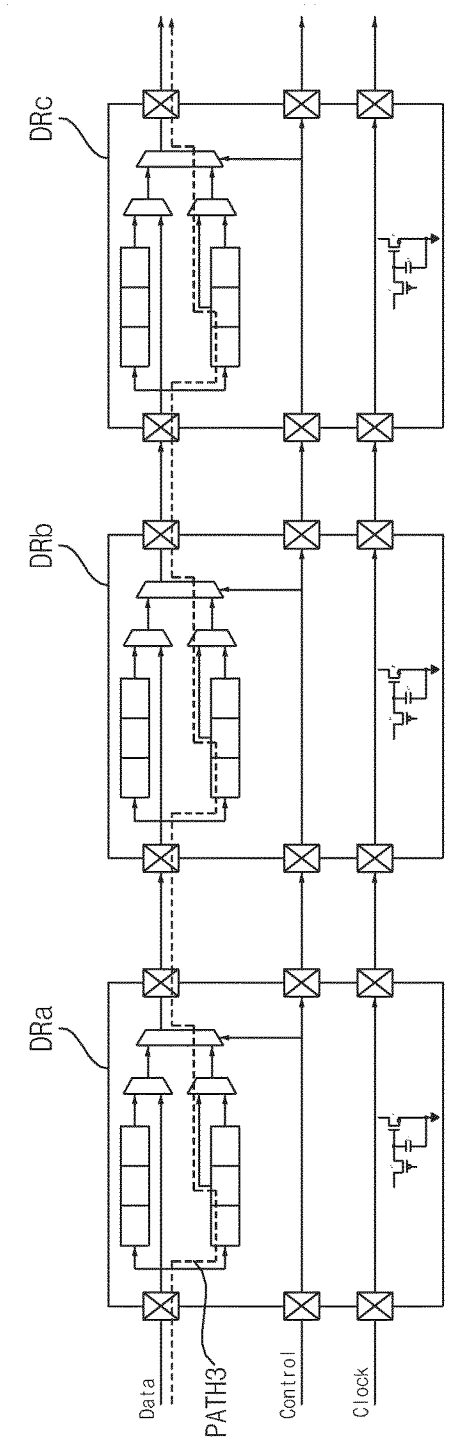

Next, FIGS. 13A and 13B are diagrams illustrating that 2-bit image data is output from the host device 810 and transmitted to three driving devices DRa to DRc.

First, FIG. 13A illustrates that in case in which the 2-bit image data IMD is input through the data input terminal Td of each of the plurality of driving devices DRa to DRc, the 2-bit image data IMD is delivered to and stored in the second shift register SFb through a third path PATH3.

In particular, FIG. 13A illustrates that since the number of second shift registers SFb is 3, 2-bit data is stored only in two shift registers, and the 2-bit image data is output to the adjacent driving device through the second multiplexer MUb and the third multiplexer MUc. FIG. 13B is a diagram illustrating that 2-bit image data is output from the host device 810 and transmitted to three driving devices DRa to DRc.

Referring to the drawing, 3-bit image data [1 1], [1 0], and [0 1] are transmitted to the first driving device DRa, the second driving device DRb, and the third driving device DRc, respectively.

To this end, the host device 810 sequentially outputs bits of 1,1, 1,0, 0,1, 0 from the time t1 to the time t7.

Meanwhile, the number of shift registers in each of the driving devices DRa to DRc is 3, but the number of bits of the transmitted image data is 2, but the host device 810 transmits the 2-bit image data without adding separate dummy data. Omission of the dummy data is differentiated from FIG. 10B.

Therefore, the length of the transmitted image data is variable regardless of the number of shift registers. Meanwhile, the bit data transmitted from the host device 810 is input through the data input terminal Td of each of the driving devices DRa to DRc.

In addition, bits of X,1, 1,1 0,0,1 are sequentially input into D0 among three second shift registers SFb in the first driving device DRa from the time t1 to the time t7. That is, 1-time time delayed bits are sequentially input.

Likewise, 2-time time delayed bits are sequentially input into D2 among three shift registers SF in the first driving device DRa.

Likewise, 3-time time delayed bits are sequentially input into D2 among three second shift registers SFb in the first driving device DRa.

Likewise, 4-time time delayed bits are sequentially input into D0 among three second shift registers SFb in the second driving device DRb.

Likewise, 6-time time delayed bits are sequentially input into D2 among three second shift registers SFb in the third driving device DRc.

Meanwhile, common control signal is input into the control input terminal Tco of each of the driving devices DRa to DRc.

In the drawing, bits of 0,0,0,0,0,0,1 are sequentially exemplified from the time t1 to the time t7. That is, only at the time t7, the bit '1' is represented, and accordingly, at the time t7, each of the driving devices DRa to DRc captures image data input and stored in the second shift register SFb therein.

That is, the second shift register SFb in the first driving device DRa captures data Ara2 of [1 0], the second shift register SFb in the second driving device DRb captures data Arb2 of [0 1], and the shift register SFb in the second driving device DRc captures data Arc2 of [1 1].

According to FIG. 13B, the number of bits of the image data is less than the number of second shift registers SFb, but the image data may be transmitted without adding the dummy data, so a period of t8 to t10 is reduced as compared with FIG. 10B. Therefore, a transmission period of the image data IMD transmitted to the plurality of driving devices DR1 to DRn can be reduced.

Meanwhile, each of the plurality of driving devices DR1 to DRn may output the common command data CCD input into the data input terminal Td to the adjacent driving device by bypassing the first shift register SFa without passing through the first shift register SFa in case in which the first signal is input into the control input terminal Tco as in FIGS. 12A and 12B, and output the data input into the data input terminal Td to the adjacent driving device by passing through the second shift register SFb in case in which the second signal (e.g., 0,0, 0, 0, 0, 0 data of t1 to t6) is input into the control input terminal Tco as in FIGS. 13A and 13B.

Meanwhile, each of the plurality of driving devices DR1 to DRn may output a driving signal Sdi for driving the light emitting diodes LED1 to LEDk based on the image data IMD stored in the second shift register SFb in case in which a third signal (e.g., '1' data of t7) is input into the control input terminal Tco after the second signal. Accordingly, the image based on the image data IMD can be displayed.

Specifically, each of the plurality of driving devices DR1 to DRn may drive the scan switching element Qa based on the clock signal input through the clock input terminal Tcl and drive the data switching element Qb based on the image data IMD input through the data input terminal Td in case in which the third signal (e.g., '1' data of t7) is input into the control input terminal Tco, after the second signal. Accordingly, the image based on the image data IMD can be displayed.

Consequently, each of the plurality of driving devices DR1 to DRn may output the driving signal Sdi which flows on the data switching element Qb to the outside, and drive the light emitting diodes LED1 to LEDk based on the driving signal Sdi. Accordingly, the image based on the image data IMD can be displayed.

Meanwhile, unlike FIGS. 13A and 13B, it is also possible that 3-bit image data is output from the host device 810 and transmitted to three driving devices DRa to DRc.

An operation thereof may be the same as FIG. 10B, so a description is omitted.

While the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

The present disclosure is applicable to a display apparatus and an image display apparatus including the same, and more particularly, to a display apparatus capable of reducing a transmission period of data transmitted to a plurality of driving devices and an image display apparatus including the same.

What is claimed is:

1. A display apparatus comprising:

a plurality of light emitting diodes; and a plurality of driving devices to output driving signals for driving the plurality of light emitting diodes, wherein each of the plurality of driving devices bypasses input common command data and outputs the common command data to an adjacent driving device, and wherein the common command data includes scan setting data for scan setting in the plurality of driving devices.

2. A display apparatus comprising:

a plurality of light emitting diodes; and a plurality of driving devices to output driving signals for driving the plurality of light emitting diodes, wherein each of the plurality of driving devices bypasses input common command data and outputs the common command data to an adjacent driving device, wherein each of the plurality of driving devices includes:

a first shift register to store command data among data input through a data input terminal, and a second shift register to store image data among the data input through the data input terminal, and wherein in case in which the common command data is input through the data input terminal, each of the plurality of driving devices outputs the common command data to an outside through a first path without passing through the first shift register, and stores the common command data in the first shift register through a second path.

3. The display apparatus of claim 2, wherein each of the plurality of driving devices:

includes the data input terminal, a control input terminal, a clock input terminal, a data output terminal, a control output terminal, and a clock output terminal, bypasses the common command data input through the data input terminal, and outputs the common command data to the adjacent driving device through the data output terminal.

4. The display apparatus of claim 3, wherein a length of control data input through the control input terminal is fixed, and a length of the image data input through the data input terminal is changed.

5. The display apparatus of claim 2, wherein in case in which individual command data is input through the data input terminal and the individual command data corresponds to identification information, each of the plurality of driving devices stores the individual command data in the first shift register, and wherein in case in which individual command data is input through the data input terminal and the individual command data does not correspond to the identification information, each of the plurality of driving devices bypasses the individual command data and outputs the individual command data to the adjacent driving device.

6. The display apparatus of claim 2, wherein each of the plurality of driving devices further includes the data input terminal, a control input terminal, a clock input terminal, a data output terminal, a control output terminal, and a clock output terminal, wherein each of the plurality of driving devices:

outputs the common command data input into the data input terminal to the adjacent driving device by bypassing the first shift register without passing through the first shift register in case in which a first signal is input into the control input terminal, and outputs the data input into the data input terminal to the adjacent driving device by bypassing the second shift register in case in which a second signal is input into the control input terminal.

7. The display apparatus of claim 6, wherein each of the plurality of driving devices outputs a driving signal for driving a corresponding one of the light emitting diodes based on the image data stored in the second shift register in case in which a third signal is input into the control input terminal after the second signal.

8. The display apparatus of claim 2, wherein each of the plurality of driving devices outputs first image data of a first number of bits to the adjacent driving device in case in which input first image data includes the first number of bits, and wherein each of the plurality of driving devices outputs second image data of a second number of bits to the adjacent driving device in case in which input second image data includes bits of a second number larger than the first number.

9. The display apparatus of claim 2, wherein each of the plurality of driving devices:

includes a shift register to store the image data among the input data, and outputs image data corresponding to bits to the adjacent driving device without adding dummy bits to the image data in case in which a number of bits of the image data is less than a than the number of shift registers.

10. The display apparatus of claim 2, wherein in case in which a number of bits of the input image data is changed, each of the plurality of driving devices stores the image data in a shift register therein and outputs the image data having changed bits to the adjacent driving device by passing through the shift register.

11. The display apparatus of claim 2, further comprising:

a host device to output the common command data to the plurality of driving devices.

12. A display apparatus comprising:

a plurality of light emitting diodes; and a plurality of driving devices to output driving signals for driving the plurality of light emitting diodes, wherein each of the plurality of driving devices bypasses input common command data and outputs the common command data to an adjacent driving device, wherein each of the plurality of driving devices:

includes a data input terminal, a control input terminal, a clock input terminal, a data output terminal, a control output terminal, and a clock output terminal, and bypasses the common command data input through the data input terminal, and outputs the common command data to the adjacent driving device through the data output terminal, wherein each of the plurality of driving devices further includes:

a scan switching element to switch based on a scan signal for driving the plurality of light emitting diodes, and a data switching element to switch based on a data signal, and wherein each of the plurality of driving devices drives the scan switching element based on a clock signal input through the clock input terminal and drives the data switching element based on image data input through the data input terminal.

13. The display apparatus of claim 12, wherein each of the plurality of driving devices outputs the driving signal flowing on the data switching element, and drives a corresponding one of the light emitting diodes.

* * * * *